United States Patent
Swartz et al.

(10) Patent No.: US 12,154,037 B1
(45) Date of Patent: Nov. 26, 2024

(54) REAL TIME FEEDBACK FROM A MACHINE LEARNING SYSTEM

(71) Applicant: FIGMA, Inc., San Francisco, CA (US)

(72) Inventors: Thomas Goodings Swartz, San Francisco, CA (US); Lawrence Wang Zhang, San Francisco, CA (US); Richard Vaughan Stebbing, San Francisco, CA (US); Michael Adam Andrews, San Francisco, CA (US); Ankur Goyal, San Francisco, CA (US)

(73) Assignee: Figma, Inc., San Francisco, CA (US)

( * ) Notice: Subject to any disclaimer, the term of this patent is extended or adjusted under 35 U.S.C. 154(b) by 1103 days.

(21) Appl. No.: 16/776,376

(22) Filed: Jan. 29, 2020

(51) Int. Cl.
*G06N 5/04* (2023.01)
*G06N 5/022* (2023.01)
*G06N 5/045* (2023.01)
*G06N 20/00* (2019.01)

(52) U.S. Cl.
CPC ............. *G06N 5/04* (2013.01); *G06N 5/022* (2013.01); *G06N 5/045* (2013.01); *G06N 20/00* (2019.01)

(58) Field of Classification Search
CPC .......... G06N 5/04; G06N 5/022; G06N 5/045; G06N 20/00
See application file for complete search history.

(56) References Cited

U.S. PATENT DOCUMENTS

| | | |
|---|---|---|
| 7,313,567 B1 | 12/2007 | Leung |
| 8,046,751 B1 | 10/2011 | Avadhanula |
| 8,739,016 B1 | 5/2014 | Goldman |
| 9,146,659 B2 | 9/2015 | Spaulding |
| 9,436,760 B1 | 9/2016 | Tacchi |
| 9,513,778 B1 | 12/2016 | Zhang |
| 9,836,183 B1 | 12/2017 | Love |
| 9,911,211 B1 | 3/2018 | Damaraju |
| 10,572,522 B1 | 2/2020 | Goyal |
| 11,699,297 B2 | 7/2023 | Gao |
| 2006/0167928 A1 | 7/2006 | Thambiratnam |

(Continued)

FOREIGN PATENT DOCUMENTS

| | | |
|---|---|---|
| CA | 2636091 | 7/2007 |
| CN | 103455576 A | 12/2013 |

(Continued)

OTHER PUBLICATIONS

IBM Tririga, "CAD Integrator/Publisher User Guide" (2020).

*Primary Examiner* — Hope C Sheffield
(74) *Attorney, Agent, or Firm* — Mahamedi IP Law LLP

(57) ABSTRACT

A technique for providing real time feedback from a machine learning system is provided that includes a method and system for interactively training machine learning models. In particular, by separating processing and analysis using static and dynamic models that are trained differently, the disclosed technique enables interactive training and prediction of machine learning models to increase the speed of generating new predictions based on real time feedback. In some cases, a dynamic model is applied to the output of a static model to generate an analysis, a correction of the analysis is received, and the correction is used to retrain the dynamic model. An updated analysis is generated based on reapplying the dynamic model to the output of the static model without having to retrain the static model.

17 Claims, 21 Drawing Sheets

(56) References Cited

U.S. PATENT DOCUMENTS

| | | |
|---|---|---|
| 2006/0184547 A1 | 8/2006 | Kamiya |
| 2006/0184873 A1 | 8/2006 | Kamiya |
| 2007/0179784 A1 | 8/2007 | Thambiratnam |
| 2008/0154936 A1 | 6/2008 | Mihaila |
| 2009/0044095 A1 | 2/2009 | Berger |
| 2011/0040808 A1 | 2/2011 | Joy |
| 2011/0282941 A1* | 11/2011 | Chan ................ G06Q 10/06 709/204 |
| 2012/0127177 A1 | 5/2012 | Kent |
| 2013/0318160 A1 | 11/2013 | Beraka |
| 2014/0074889 A1 | 3/2014 | Neels |
| 2014/0108322 A1 | 4/2014 | Buchanan |
| 2014/0156581 A1 | 6/2014 | Jayaraman |
| 2014/0201124 A1 | 7/2014 | Proctor |
| 2015/0019460 A1* | 1/2015 | Simard ................ G06N 7/01 706/11 |
| 2015/0033086 A1 | 1/2015 | Sasturkar et al. |
| 2015/0095303 A1 | 4/2015 | Sonmez |
| 2016/0078022 A1 | 3/2016 | Lisuk |
| 2016/0179313 A1 | 6/2016 | Ho |
| 2016/0232226 A1 | 8/2016 | McManis, Jr. |
| 2016/0371238 A1 | 12/2016 | Heavenrich |
| 2017/0032052 A1 | 2/2017 | Raman |
| 2017/0039341 A1 | 2/2017 | Shklarski |
| 2017/0075904 A1 | 3/2017 | Hedges |
| 2017/0286489 A1 | 10/2017 | Dantressangle |
| 2017/0329844 A1 | 11/2017 | Tacchi |
| 2017/0330106 A1 | 11/2017 | Lindsley |
| 2018/0052884 A1 | 2/2018 | Kale et al. |
| 2018/0113865 A1 | 4/2018 | Najork |
| 2018/0181750 A1 | 6/2018 | Lamothe-Brassard |
| 2018/0330331 A1 | 11/2018 | Nair |
| 2018/0373952 A1* | 12/2018 | Bui ........................ G06Q 10/10 |
| 2019/0073420 A1 | 3/2019 | Agapiev |
| 2019/0138345 A1 | 5/2019 | Singh |
| 2019/0138654 A1 | 5/2019 | Arora |
| 2019/0379797 A1 | 12/2019 | Sahagun |
| 2020/0075165 A1* | 3/2020 | Lieberman ............ G06N 3/047 |
| 2020/0097601 A1 | 3/2020 | Han |
| 2020/0341978 A1 | 10/2020 | Shah |
| 2021/0034625 A1 | 2/2021 | Shah |
| 2021/0194888 A1 | 6/2021 | Bhaskar |
| 2021/0398025 A1 | 12/2021 | Yamamoto |
| 2022/0075515 A1 | 3/2022 | Floren |
| 2022/0253719 A1 | 8/2022 | Ramos |
| 2022/0284362 A1 | 9/2022 | Bellinger |

FOREIGN PATENT DOCUMENTS

| | | |
|---|---|---|
| CN | 104036048 | 9/2014 |
| CN | 103729395 | 11/2017 |
| CN | 111311461 | 6/2020 |
| JP | 2007293874 | 11/2007 |
| KR | 101226163 | 1/2013 |
| WO | WO-2015/095915 | 7/2015 |
| WO | WO-2020/139861 | 7/2020 |

* cited by examiner

REAL TIME FEEDBACK FROM A MACHINE LEARNING SYSTEM

BACKGROUND OF THE INVENTION

Existing systems for training models such as machine learning models are often cumbersome to use, requiring large amounts of data and computational resources for training and a separate interface to relabel or label target fields and to rerun or retrain the models whenever targets are relabeled or old labels are corrected. As a result, existing systems often fail to provide predictions based on small amounts of data and cannot provide interactive or real time feedback in the context of training machine learning models.

Accordingly, a solution is needed for interactive model training and prediction generation that provides a quick and interactive method of identifying errors in predictions, retraining the models, and updating predictions based on the retrained models and interactive user feedback in real time.

BRIEF DESCRIPTION OF THE DRAWINGS

Various embodiments of the invention are disclosed in the following detailed description and the accompanying drawings.

DETAILED DESCRIPTION

Figure 1:
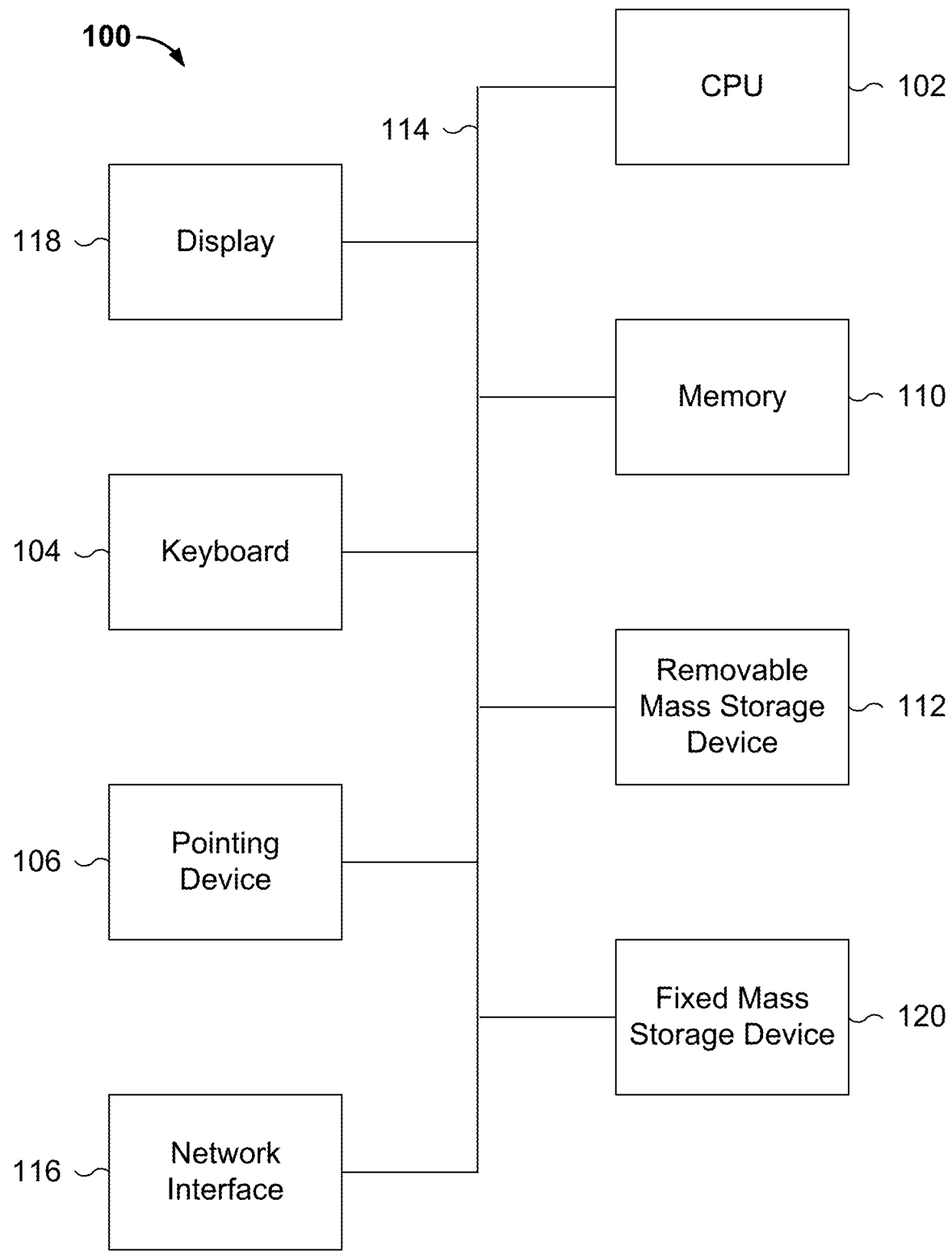
FIG. 1 depicts one embodiment of a general purpose computer system that can be used for interactive model training and prediction generation and for providing real time feedback from a machine learning system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique for interactive model training and prediction generation is provided that includes a method and system for displaying, managing, and extracting desired information from a corpus of files. The technique enables a user to interactively add and delete files, define target fields, specify machine learning algorithms to be applied for predictions, set labels for ground truth specifications to generate predictions, relabel predictions to define new ground truth specifications to generate updated predictions in real time to extract desired information from the files.

Additionally, a technique for providing real time feedback from a machine learning system is provided that includes a method and system for interactively training machine learning models. By separating processing and analysis using static and dynamic models that are trained differently, the disclosed technique enables interactive training and prediction of machine learning models to increase the speed of generating new predictions based on real time feedback. For example, certain tasks that can be performed ahead of time are pre-calculated and pre-processed to generate a static model that does not require retraining while other tasks (e.g., tasks requiring computation that is custom to the problem being solved) are performed as needed (e.g., in real time) to generate or update a dynamic model that is subject to retraining. In some cases, a dynamic model is applied to the output of a static model to generate an analysis, a correction of the analysis is received, and the correction is used to retrain the dynamic machine learning model. An updated analysis is generated based on reapplying the dynamic model to the output of the static model without having to retrain the static model.

FIG. 1 is a block diagram of a computer system 100. FIG. 1 depicts one embodiment of a general purpose computer system. In some embodiments, the computer system 100 is used to perform interactive model training and prediction generation. In some embodiments, the computer system 100 is used for providing real time feedback from a machine learning system.

Other computer system architectures and configurations can be used for carrying out the processing of the disclosed techniques. Computer system 100, made up of various subsystems described below, includes at least one microprocessor subsystem (also referred to as a central processing unit, or CPU) 102. That is, CPU 102 can be implemented by a single-chip processor or by multiple processors. In some embodiments CPU 102 is a general purpose digital processor which controls the operation of the computer system 100. Using instructions retrieved from memory 110, the CPU 102 controls the reception and manipulation of input data, and the output and display of data on output devices.

CPU 102 is coupled bi-directionally with memory 110 which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on CPU 102. Also as well known in the art, primary storage typically includes basic operating instructions, program code, data and objects used by the CPU 102 to perform its functions. Primary storage devices 110 may include any suitable computer-readable storage media, described below, depending on whether, for example, data access needs to be bi-directional or uni-directional. CPU 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to CPU 102. Storage 112 may also include computer-readable media such as magnetic tape, flash memory, signals embodied on a carrier wave, PC-CARDS, portable mass storage devices, holographic storage devices, and other storage devices. A fixed mass storage 120 can also provide additional data storage capacity. The most common example of mass storage 120 is a hard disk drive. Mass storage 112, 120 generally store additional programming instructions, data, and the like that typically are not in active use by the CPU 102. It will be appreciated that the information retained within mass storage 112, 120 may be incorporated, if needed, in standard fashion as part of primary storage 110 (e.g. RAM) as virtual memory.

In addition to providing CPU 102 access to storage subsystems, bus 114 can be used to provide access other subsystems and devices as well. In the described embodiment, these can include a display monitor 118, a network interface 116, a keyboard 104, and a pointing device 106, as well as an auxiliary input/output device interface, a sound card, speakers, and other subsystems as needed. The pointing device 106 may be a mouse, stylus, track ball, or tablet, and is useful for interacting with a graphical user interface.

The network interface 116 allows CPU 102 to be coupled to another computer, computer network, or telecommunications network using a network connection as shown. Through the network interface 116, it is contemplated that the CPU 102 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 102 can be used to connect the computer system 100 to an external network and transfer data according to standard protocols. That is, method embodiments of the disclosed techniques may execute solely upon CPU 102, or may be performed across a network such as the Internet, intranet networks, or local area networks, in conjunction with a remote CPU that shares a portion of the processing. Additional mass storage devices (not shown) may also be connected to CPU 102 through network interface 116.

An auxiliary I/O device interface (not shown) can be used in conjunction with computer system 100. The auxiliary I/O device interface can include general and customized interfaces that allow the CPU 102 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the disclosed techniques further relate to computer storage products with a computer readable medium that contains program code for performing various computer-implemented operations. The computer-readable medium is any data storage device that can store data which can thereafter be read by a computer system. The media and program code may be those specially designed and constructed for the purposes of the disclosed techniques, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

The computer system shown in FIG. 1 is but an example of a computer system suitable for use with the disclosed techniques. Other computer systems suitable for use with the disclosed techniques may include additional or fewer subsystems. In addition, bus 114 is illustrative of any interconnection scheme serving to link the subsystems. Other computer architectures having different configurations of subsystems may also be utilized.

In some embodiments CPU 102 is a general purpose digital processor which controls the operation of the computer system 100. Using instructions retrieved from memory 110, the CPU 102 controls the reception and manipulation of input data, and the output and display of data on output devices.

In some embodiments, a system of interactive model training and prediction generation as described herein comprises a processor (e.g., CPU 102) and a memory (e.g., memory 110) coupled with the processor. The memory is configured to provide the processor with instructions which when executed cause the processor to: display a corpus of files wherein at least some of the files have a target field; receive for at least one of the files, a ground truth specification of the target field so that the file becomes a ground truth file; train the model in response to receiving the ground truth specification of the target field; receive from the model a predicted specification of the target field for at least one of the other files in the corpus of files so that the file becomes a predicted file; and display the ground truth specification associated with the ground truth file and the predicted specification associated with the predicted file.

In some cases, the memory is further configured to provide the processor with instructions which when executed cause the processor to: receive a ground truth specification for the predicted file so that the predicted file becomes a new ground truth file; retrain the model in response to receiving the ground truth specification for the predicted file; receive from the retrained model a predicted specification of the target field for at least one of the other files in the corpus of files so that the file becomes a predicted file based at least in part on the retrained model; and display the ground truth specification associated with the new ground truth file and the predicted specification received from the retrained model associated with the predicted file.

In some embodiments, the ground truth specification and the predicted specification are displayed with different indicia. In some cases, a table format is used for the display of values. For example, a selected file can added to the corpus of files in response to dragging and dropping the selected file into a row of the table format. In some cases, the selected file comprises a plurality of files. In such cases, a user may select a plurality of files to drag and drop into the table format. The files can be displayed in rows of the table format and the target field can be displayed in a column of the table format.

In some embodiments, a new target field is defined or generated by adding a new column associated with the new target field to the table format. A file can be deleted from the corpus of files. In some cases, an operation is received on the target field. In other cases, metadata associated with the target field is received. In some examples, the system is configured to request metadata associated with the target field.

In some embodiments, a computer program product for interactive model training and prediction generation is provided, the computer program product being embodied in a tangible non-transitory computer readable storage medium and comprising computer instructions for: displaying a corpus of files wherein at least some of the files have a target field; receiving for at least one of the files, a ground truth specification of the target field so that the file becomes a ground truth file; training the model in response to receiving the ground truth specification of the target field; receiving from the model a predicted specification of the target field for at least one of the other files in the corpus of files so that the file becomes a predicted file; and displaying the ground truth specification associated with the ground truth file and the predicted specification associated with the predicted file.

In some embodiments, a system for providing real time feedback from a machine learning system comprises as described herein comprises a processor (e.g., CPU 102) and a memory (e.g., memory 110) coupled with the processor. The memory is configured to provide the processor with instructions which when executed cause the processor to: receive a corpus of files to be analyzed; apply a static machine learning model at least one of the files to generate an output; apply a dynamic machine learning model to the output of the static machine learning model to generate an analysis of the file; receive a correction of the analysis; retrain the dynamic machine learning model in response to the correction; and generate an updated analysis of other files in the corpus of files based at least in part on reapplying the dynamic machine learning model to the output of the static machine learning model for each of the other files.

In some embodiments, applying a static machine learning model comprises pre-processing the corpus of files to be analyzed. In some cases, applying a static machine learning model comprises pre-processing the corpus of files to be analyzed including by normalizing the files and storing the normalized files. An algorithm (e.g., a machine learning algorithm) can be run on the normalized files and in some examples, running the algorithm depends on the file type.

In some embodiments, at least some of the files have a target field and the analysis of the file is based at least in part on a ground truth file generated in response to receiving a ground truth specification of the target field for the ground truth file. The analysis of the file can comprise a predicted specification based at least in part on a ground truth file. The ground truth file is generated in response to receiving a ground truth specification of the target field for the ground truth file.

In some embodiments, at least some of the files have a target field and the analysis of the file comprises a predicted specification so that the analyzed file becomes a predicted file. The analysis of the file can comprise a predicted specification based at least in part on a ground truth file. The ground truth file is generated in response to receiving a ground truth specification of the target field for the ground truth file. Receiving a correction of the analysis comprises receiving a ground truth specification for the predicted file so that the predicted file becomes a new ground truth file. Retraining the dynamic machine learning model in response to the correction comprises retraining the dynamic machine learning model in response to receiving the ground truth specification for the predicted file. Generating an updated analysis of other files in the corpus of files based at least in part on reapplying the dynamic machine learning model to the output of the static machine learning model for each of the other files comprises receiving from the retrained dynamic machine learning model a predicted specification of the target field for at least one of the other files in the corpus of files so that the file becomes a predicted file based at least in part on the retrained dynamic machine learning model.

In some embodiments, a computer program product providing real time feedback from a machine learning system is disclosed, the computer program product being embodied in a tangible non-transitory computer readable storage medium and comprising computer instructions for: receiving a corpus of files to be analyzed; applying a static machine learning model at least one of the files to generate an output; applying a dynamic machine learning model to the output of the static machine learning model to generate an analysis of the file; receiving a correction of the analysis; retraining the dynamic machine learning model in response to the correction; and generating an updated analysis of other files in the corpus of files based at least in part on reapplying the dynamic machine learning model to the output of the static machine learning model for each of the other files.

Figure 2:
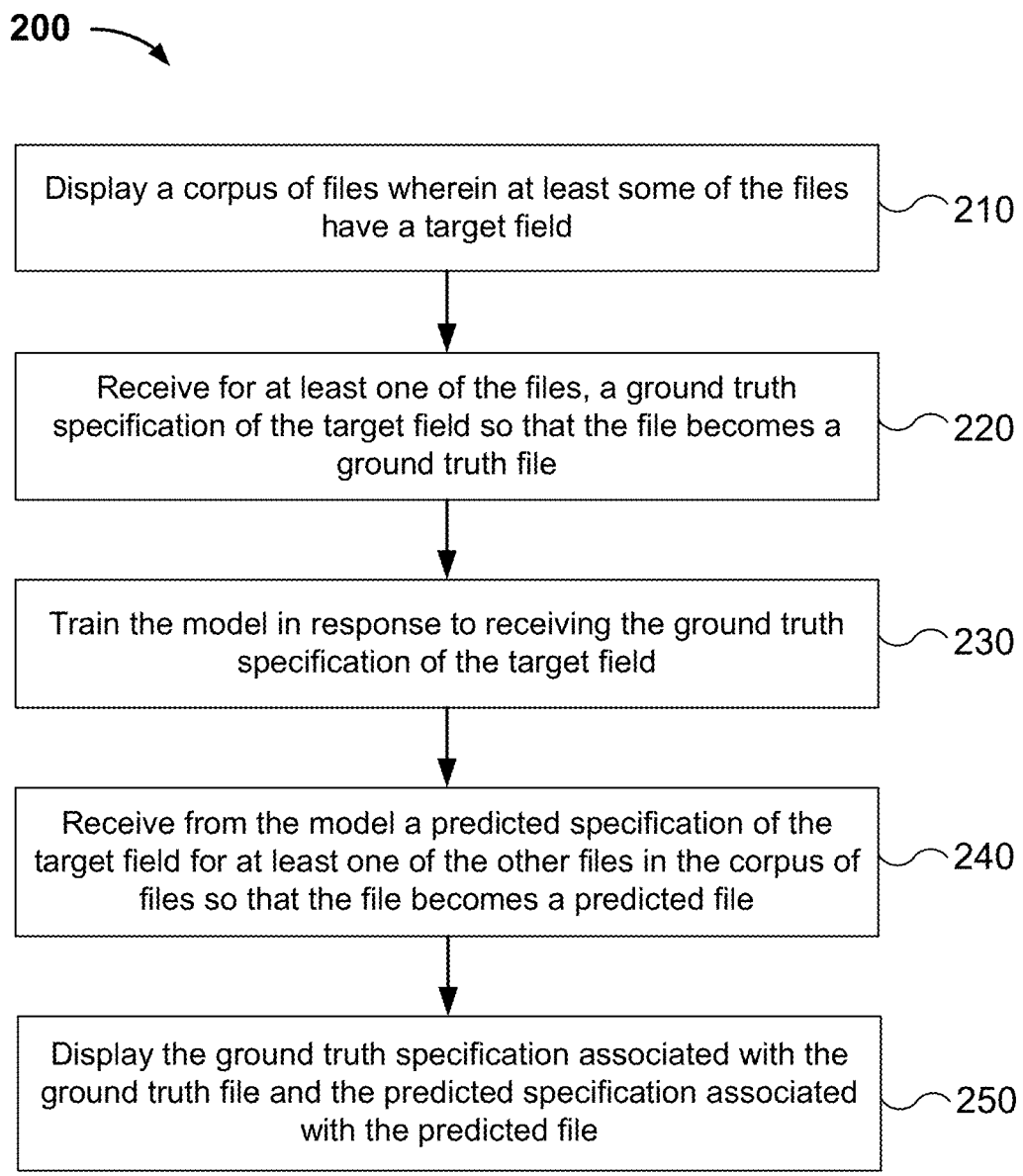
FIG. 2 is a flowchart of an embodiment of a method for interactive model training and prediction generation that can be performed by the exemplary system depicted in FIG. 1.

FIG. 2 is a flowchart of an embodiment of a method 200 for interactive model training and prediction generation that can be performed by the exemplary system 100 depicted in FIG. 1.

As shown in FIG. 2, a method 200 for interactive model training and prediction generation includes a step, shown at 210, of displaying a corpus of files wherein at least some of the files have a target field. At 220, the method includes receiving for at least one of the files, a ground truth specification of the target field so that the file becomes a ground truth file. At 230, the method includes training the model in response to receiving the ground truth specification of the target field. As shown in FIG. 2, the method 200 also includes receiving from the model a predicted specification of the target field for at least one of the other files in the corpus of files so that the file becomes a predicted file at 240 and displaying the ground truth specification associated with the ground truth file and the predicted specification associated with the predicted file at 250. The steps depicted in FIG. 2 as well as additional description and details of the disclosed technique for interactive model training and prediction generation are described below with respect to a particular embodiment.

FIGS. 3-20 illustrate screenshots of one embodiment of the disclosed technique for interactive model training and prediction generation that includes a method and system as described herein for displaying, managing, and extracting desired information from a corpus of files. In this particular example, the files are purchase orders and the desired information the user wishes to extract from the files includes purchase order numbers, customer names, and invoice totals. As will be described in further detail with respect to FIGS. 3-20, the disclosed technique enables the user to interactively add and delete files, define target fields, specify machine learning algorithms to be applied for predictions, set labels for ground truth specifications to generate predictions, relabel predictions to define new ground truth specifications to generate updated predictions in real time to extract desired information (e.g., purchase order numbers, customer names, and invoice totals) from the files.

Figure 3:
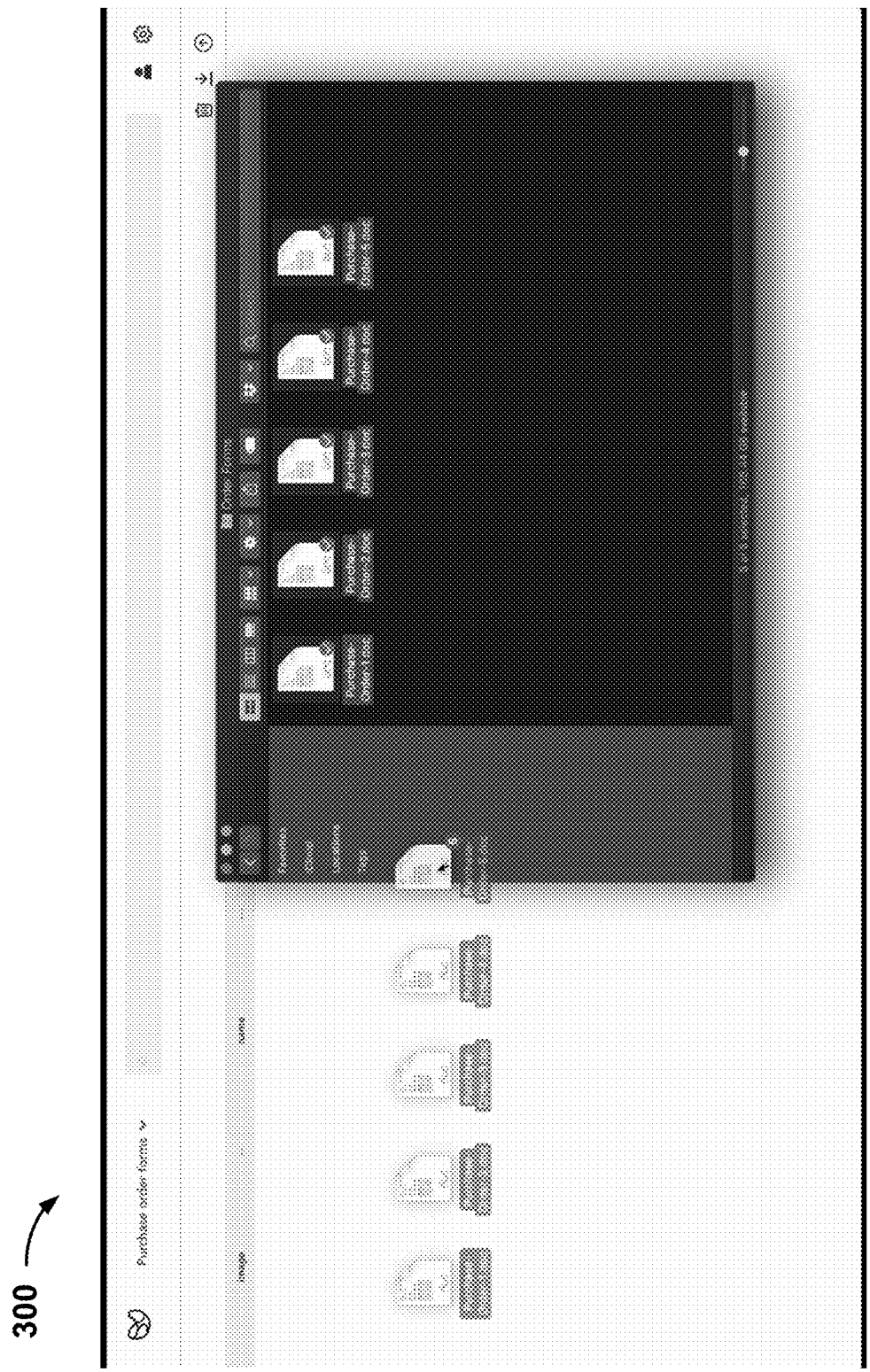
FIG. 3 depicts a screenshot of one embodiment of the disclosed technique that shows how a user defines a corpus of files of interest.

FIG. 3 depicts a screenshot 300 of one embodiment or application of the disclosed technique that shows how a user defines a corpus of files of interest. Once a file or a plurality of files is selected and loaded into the application, the corpus of files is displayed. As an example, a selected file can be added to the corpus of files by dragging and dropping the selected file into a table format. FIG. 3 shows the selection of a plurality of files, in this case a set of five files, having the filenames Purchase-Order-1.doc, Purchase-Order-2.doc, Purchase-Order-3.doc, Purchase-Order-4.doc, and Purchase-Order-5.doc respectively. The files are selected to form the corpus of files by dragging and dropping the files into the application.

Figure 4:
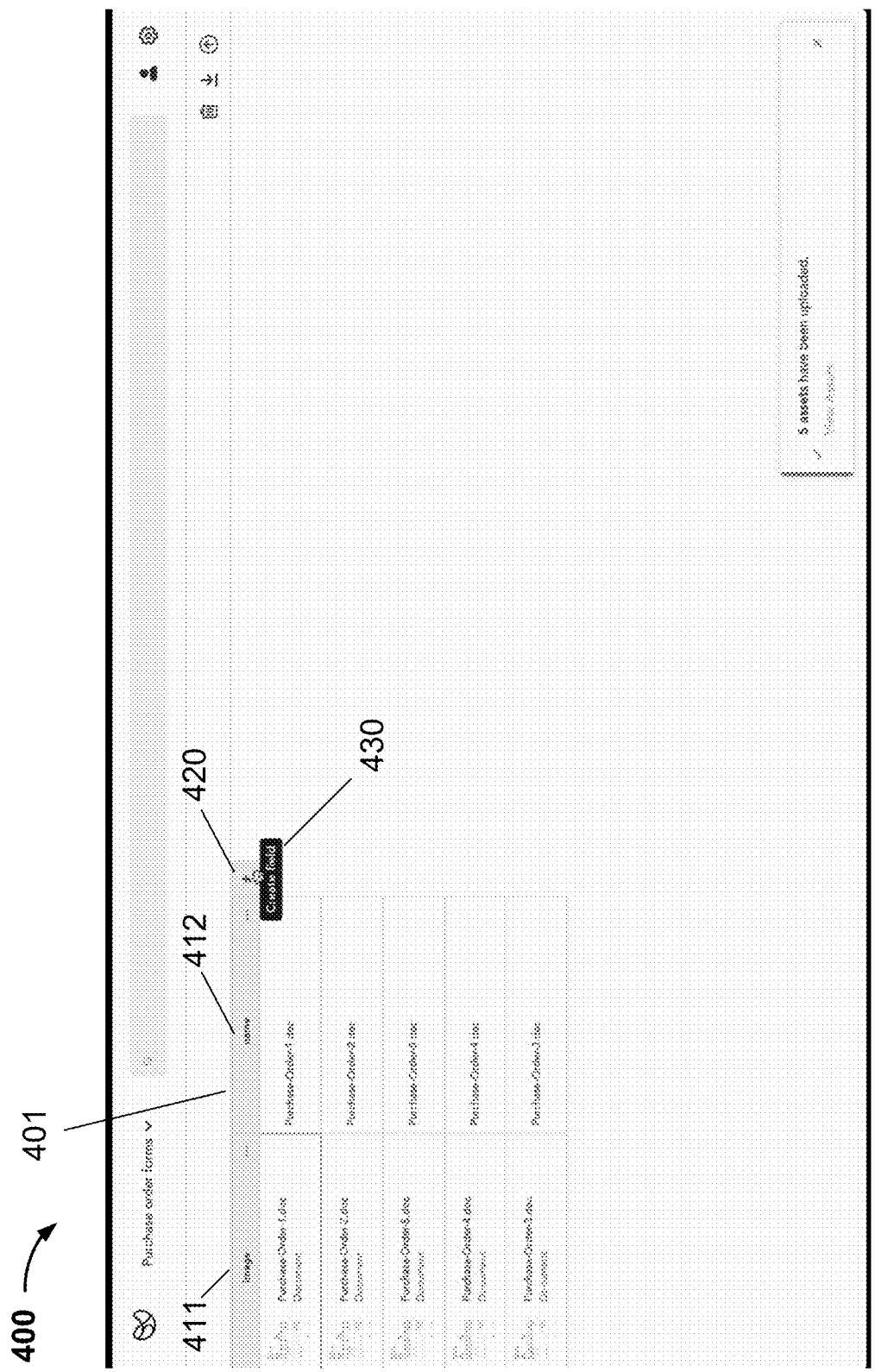
FIG. 4 depicts a screenshot of an embodiment that shows a display of a corpus of files.

FIG. 4 depicts a screenshot 400 of an embodiment that shows a display of the corpus of files. At least some of the files in the corpus of files have a target field, which will be described in more detail below. In the example shown in FIG. 4, the five files selected by the user as shown in FIG. 3 are displayed in a table format (e.g., at 401), where each row of the table corresponds to a file in the corpus of files, and each column of the table designates an attribute or some representation of the file. The header of each column can be populated automatically by the system or can be defined by the user. In this case, in response to the dragging and dropping of the files as shown in FIG. 3, an image of each file is extracted and is represented in column 411 (e.g., having the header "Image"), and the filename of each file is extracted and listed in column 412 (e.g., having the header "name"). The table shown in screenshot 400 is generated automatically by the system to display the corpus of files selected by the user.

As shown in FIG. 4, a user selects or clicks on a select element such as a button at 420 (e.g., depicted by a "+" icon) in order to define a new attribute or representation of a file. An attribute of a file includes, for example, desired information extracted, derived, calculated or generated from an analysis of the file. In this case, by clicking the "+" icon at 420, the user creates a new field and can specify a name for the new field. Note that placing the cursor over the "+" icon prompts the display of an indicator 430 that shows the functionality of the button, which in this case is "Create field."

Figure 5:
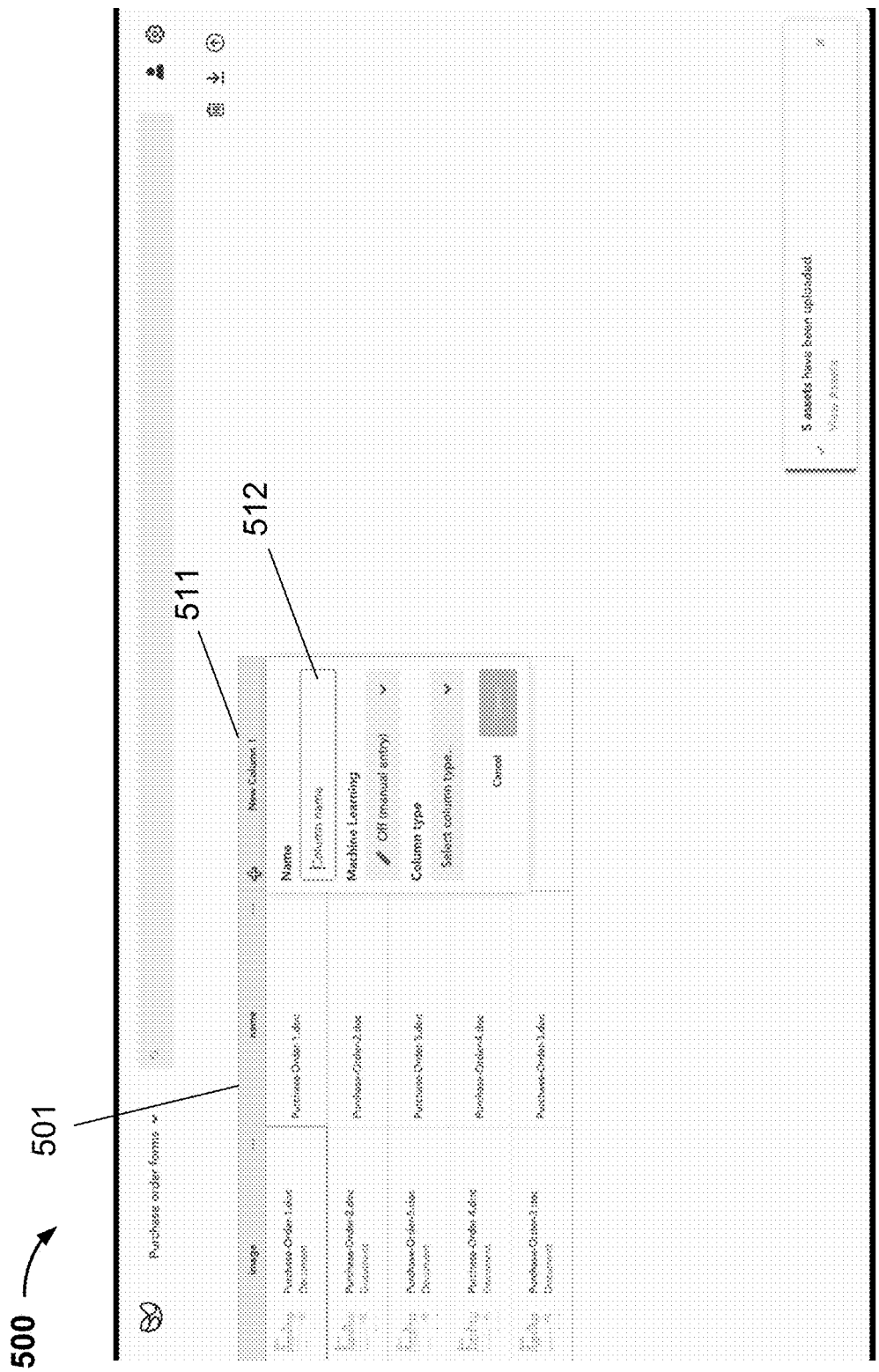
FIG. 5 depicts a screenshot of an embodiment that shows a display of the corpus of files after creating a new field.
Figure 6:
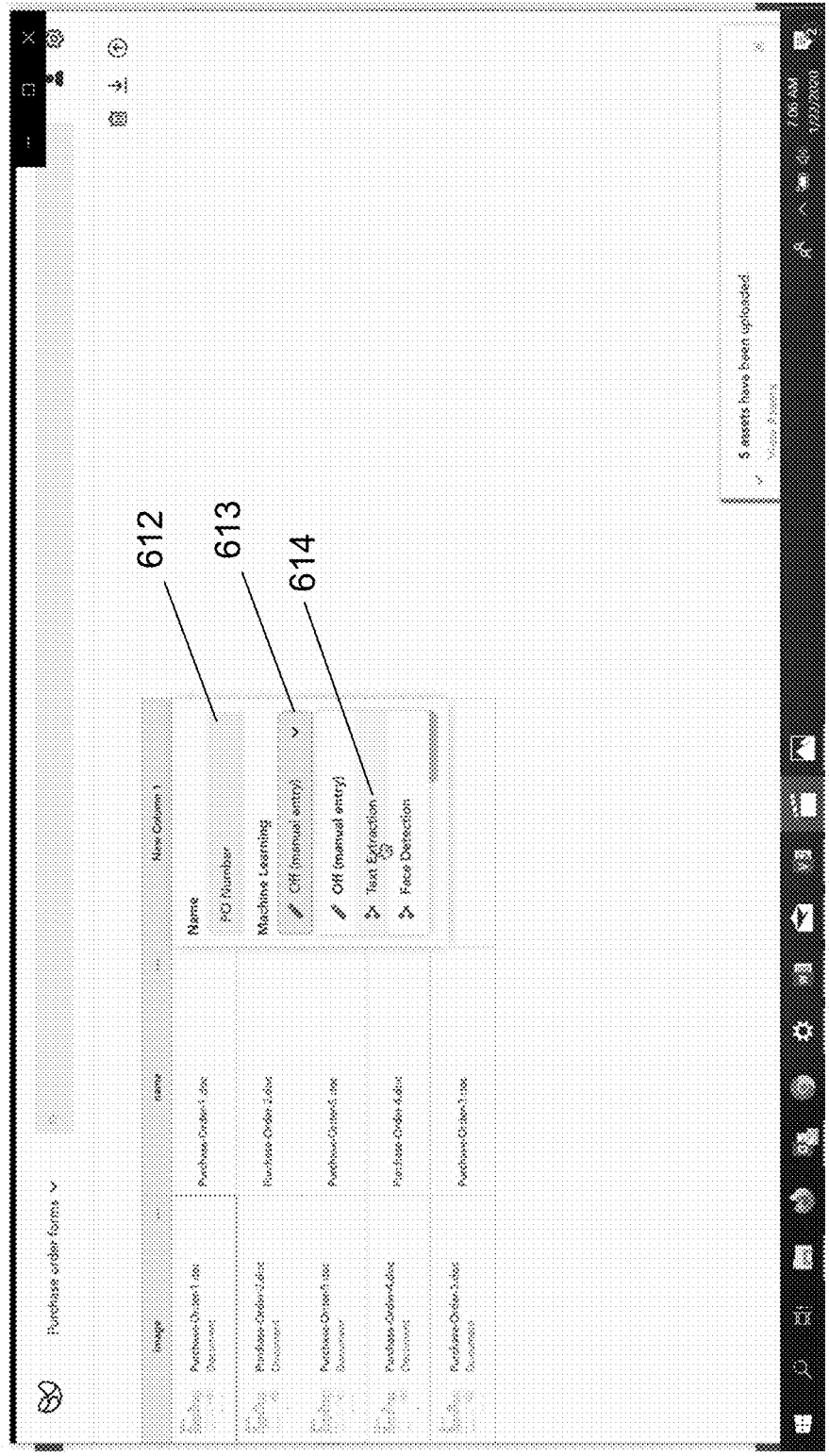
FIG. 6 depicts a screenshot of an embodiment that shows a display of the corpus of files after the user has entered a column name.
Figure 7:
FIG. 7 depicts a screenshot of an embodiment that shows a display of the corpus of files and the final steps needed to create a new column.

FIG. 5 depicts a screenshot of an embodiment that shows a display of the corpus of files after creating a new field. In particular, shows a display of the corpus of files after selecting the "Create field" selection element or button as described with respect to FIG. 4. FIGS. 5-7 depict various steps in creating a new field. The newly created field is added as a new column to the existing table (e.g., shown at 501) that displays the corpus of files.

As shown in FIG. 5, a new column (shown as "New Column 1") is generated at 511 in response to selecting or clicking button 420 of FIG. 4. The user can specify or enter a column name for the column at 512.

FIG. 6 depicts a screenshot 600 of an embodiment that shows a display of the corpus of files after the user has entered a column name as described with respect to FIG. 5. Here, the desired information the user wishes to extract and populate in the new column is the purchase order number or PO Number for each purchase order. Accordingly, in the example shown, the user enters "PO Number" as the column name (e.g., shown at 612). A dropdown bar (e.g., shown at 613) allows the user to select a machine learning algorithm to apply in the extraction of a target field (e.g., value that corresponds to a PO Number) or an analysis of the file. Although the options shown in this example are limited to "Manuel entry," "Text extraction," and "Face recognition," other options may be added without limiting the scope of the disclosed technique. In this particular case, the user selects "Text extraction" (e.g., shown at 613) as the machine learning algorithm for the extraction of the target field, which in this case is the value corresponding to the PO Number in each purchase order.

FIG. 7 depicts a screenshot 700 of an embodiment that shows a display of the corpus of files and the final steps needed to create a new column. As described above, FIG. 7 shows that the user has entered "PO Number" as the column name (e.g., shown at 712) and has selected "Text extraction" (e.g., shown at 713) as the machine learning algorithm for the extraction of the target field. FIG. 7 also shows that the text will be extracted from an image of the file (e.g., shown at 715). To complete the process of creating a new column, the user also selects a column type from a dropdown menu (e.g., shown at 716). In this particular example, because the target field is the value corresponding to the PO Number, the user selects "Number" as opposed to "Text" as the column type.

Figure 8:
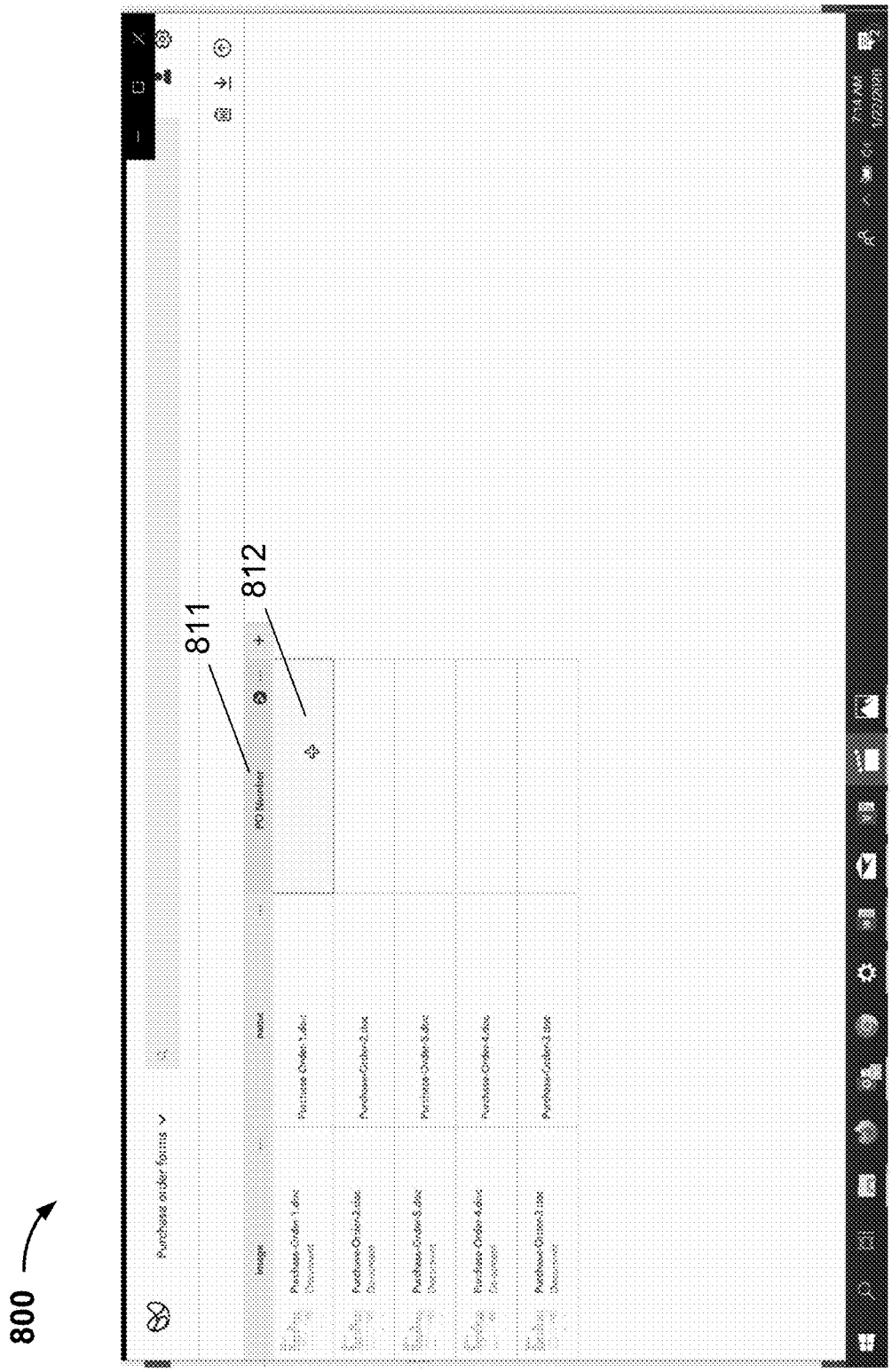
FIG. 8 depicts a screenshot of an embodiment that shows a display of the corpus of files and the newly created column PO Number.

FIG. 8 depicts a screenshot 800 of an embodiment that shows a display of the corpus of files and the newly created column PO Number. The column name "PO Number" as specified or entered by the user is shown as the heading for the new column (e.g., shown at 811). At this point, the system is ready to receive an indication or example of the target field as specified by the user. This indication or example will define a ground truth specification used to train the predictive model (e.g., machine learning model). In this example, the user can select or click an empty cell under the newly created column (e.g., shown at 812). Based on the user preferences (i.e., the specifications or parameters) specified in creating the column (e.g., "Text extraction" from "Image"), selecting or clicking the empty cell prompts the system to display an image of the file corresponding to that cell. Here, because the empty cell corresponds to the first row which corresponds to the file named "Purchase-Order-1.doc," the system displays the image of Purchase-Order-1.doc.

Figure 9:
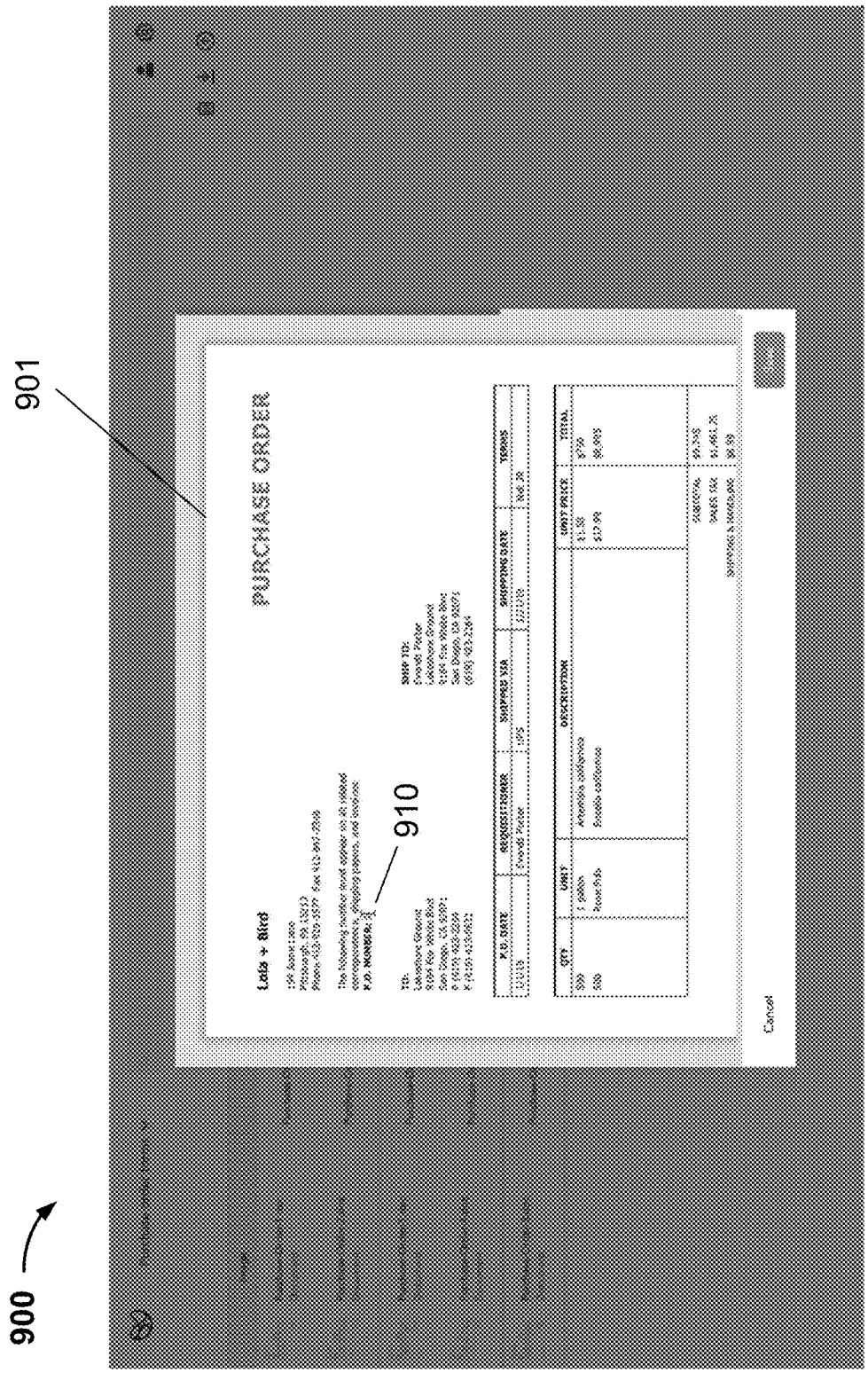
FIG. 9 depicts a screenshot 900 of an embodiment that shows a display in response to the user's selection of the empty cell as described with respect to FIG. 8.

FIG. 9 depicts a screenshot 900 of an embodiment that shows a display in response to the user's selection of the empty cell as described with respect to FIG. 8. Here, the system displays the image of Purchase-Order-1.doc (e.g., shown at 901). In this case, the image 901 has been pre-processed (e.g., run through an OCR program to permit text searching and extraction), which enables the user to select or highlight a portion of the image to specify the target field. The user identifies the purchase order number by highlighting (e.g., shown at 910) the purchase order number as it appears in the image 901. In this manner, the user can specify or define a ground truth specification of the target field (e.g., value corresponding to the PO Number) by identifying and highlighting the actual target field (e.g., "1" shown at 910) on a particular image. Once the user highlights a selected portion of text in an image (e.g., "1" shown at 910) thereby designating the selected portion of text as a ground truth specification of the target field, the system receives the ground truth specification of the target field and the associated file (in this case, Purchase-Order-1.doc) becomes a ground truth file for that target field (in this case, the value corresponding to the PO Number).

Figure 10:
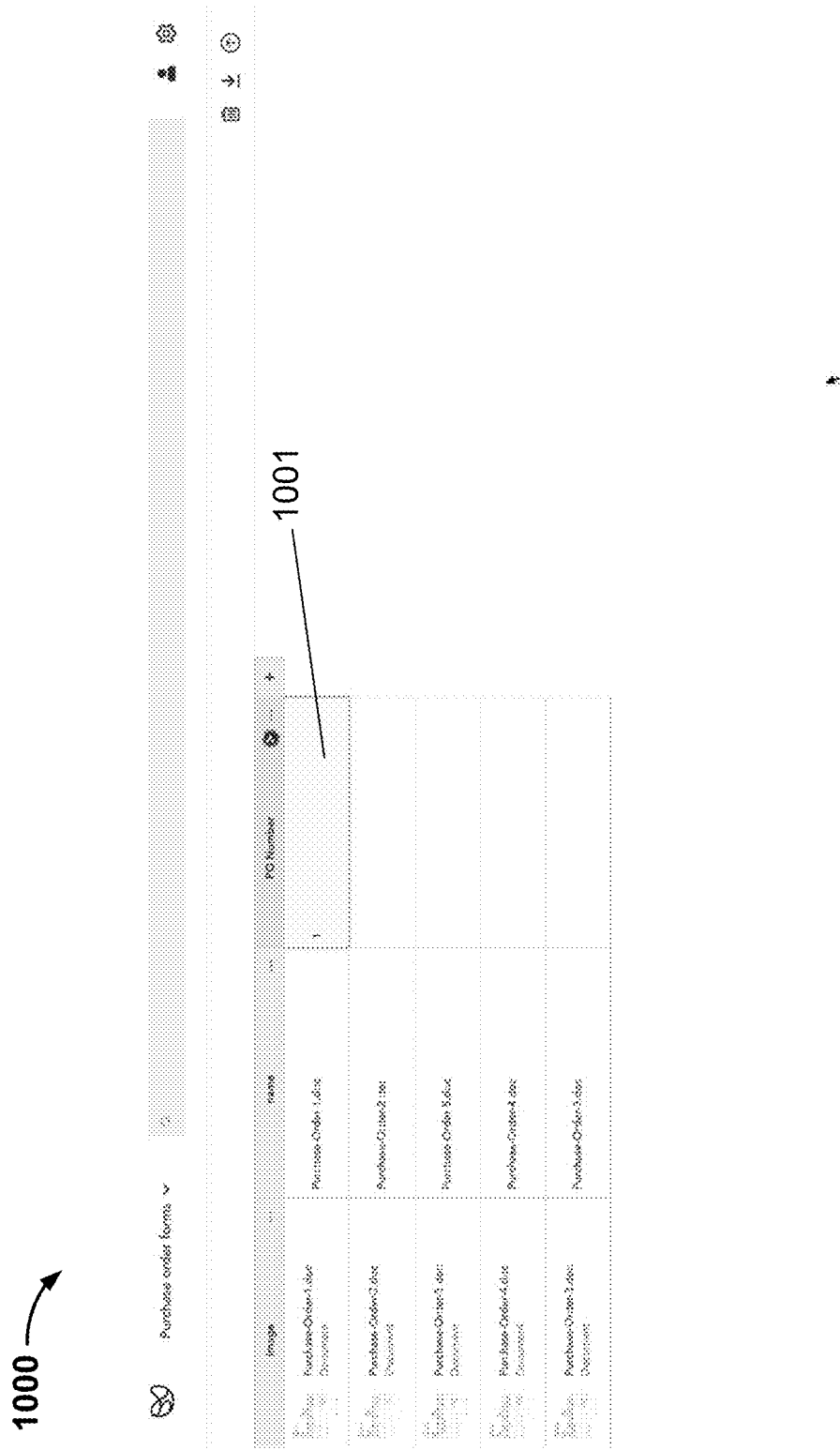
FIG. 10 depicts a screenshot of an embodiment that shows a display of the corpus of files in response to the user's designation of a ground truth specification.

FIG. 10 depicts a screenshot 1000 of an embodiment that shows a display of the corpus of files in response to the user's designation of a selected portion of text as a ground truth specification of the target field. Here, the system has received for at least one of the files, a ground truth specification of the target field so that the file becomes a ground truth file. In this case, for the file Purchase-Order-1.doc, a ground truth specification of the target field (e.g., shown at 910 of FIG. 9) has been received and Purchase-Order-1.doc becomes a ground truth file. The ground truth specification of the target field is displayed at 1001, having the numerical value of "1." Once the ground truth specification of the target field has been received for at least one of the files so that the file becomes a ground truth file, the system trains the model in response to receiving the ground truth specification of the target field.

In some cases, the system trains the model according to the preferences as specified by the user with respect to model training. In this case, the user selected "Text extraction" as the machine learning algorithm (e.g., shown at 613 of FIG. 6). Accordingly, in this example, the system applies a text extraction machine learning algorithm to predict an output or predicted specification for the target field for each of the other files in the corpus of files. The system then receives from the model a predicted specification of the target field for at least one of the other files in the corpus of files so that the file becomes a predicted file. Finally, as shown in FIG. 11, the system displays the ground truth specification associated with the ground truth file and the predicted specification associated with the predicted file.

Figure 11:
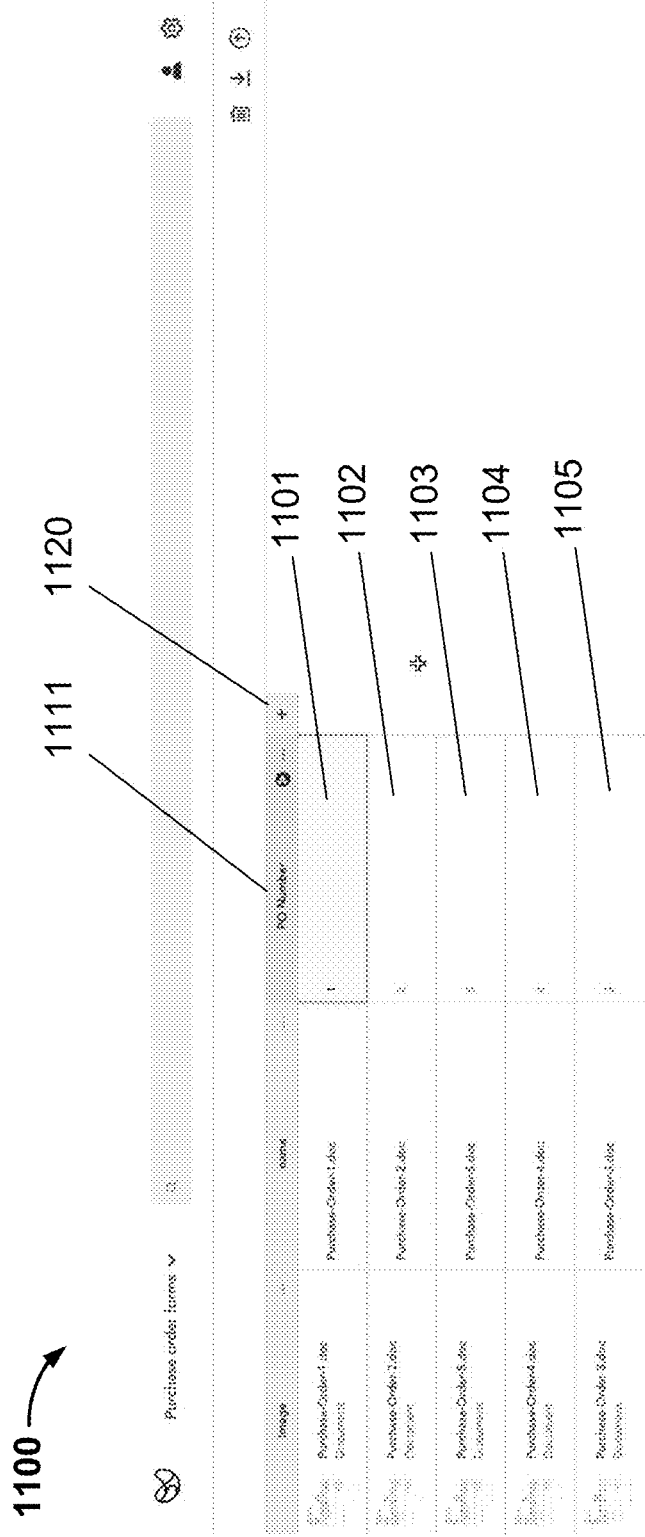
FIG. 11 depicts a screenshot of an embodiment that shows a display of a newly created column with ground truth specification and predicted specifications of the target field.

FIG. 11 depicts a screenshot 1100 of an embodiment that shows a display of the newly created column with ground truth specification and predicted specifications of the target field, which in this case, is the value corresponding to the PO Number for each of the files. In particular, the newly created column has a heading "PO Number" (e.g., shown at 1111). The ground truth specification associated with the ground truth file is displayed (e.g., shown at 1101) along with the predicted specification associated with each of the predicted files. In this case, the predicted specification of "2" (e.g., shown at 1102) is extracted and displayed from the predicted file Purchase-Order-2.doc, the predicted specification of "3" (e.g., shown at 1103) is extracted and displayed from the predicted file Purchase-Order-3.doc, the predicted specification of "4" (e.g., shown at 1104) is extracted and displayed from the predicted file Purchase-Order-4.doc, and the predicted specification of "5" (e.g., shown at 1105) is extracted and displayed from the predicted file Purchase-Order-5.doc.

In some embodiments, the ground truth specification and the predicted specification are displayed with different indicia, such as for example, displayed in different colors, fonts, or using emphasis such as highlighting or underlining to differentiate the ground truth specification from the predicted specifications. For example, the ground truth specification, which in this case has the numerical value of "1" (e.g., shown at 1101) from the ground truth file Purchase-Order-1.doc, can be displayed in a different color (e.g., black) while the predicted specifications (e.g., shown at 1102, 1103, 1104, and 1105 respectively) can be displayed in orange. Similarly, different indicia can be used to indicate a confidence level associated with a predicted specification, wherein the confidence level is calculated by the model used to generate the predicted specification. For example, different thresholds can be set for high confidence (e.g., confidence levels of at least 80%), medium confidence (e.g., confidence levels between 50-80%), and low confidence (e.g., confidence levels of less than 50%).

Returning to the present example, FIGS. 4-11 show the process of creating a new column based on a target field wherein once the system has received at least one ground truth specification, the predicted specifications of the target field are generated and displayed based on training a model in response to the ground truth specification. This process of creating new columns can be repeated for other target fields as defined by the user in order to extract or generate desired information obtained from analyzing the files. For example, if a user wishes to extract the customer name from each purchase order, the user can create a new "Customer" column by selecting "Create field" (e.g., shown as the "+" icon at 1120 of FIG. 11).

Figure 12:
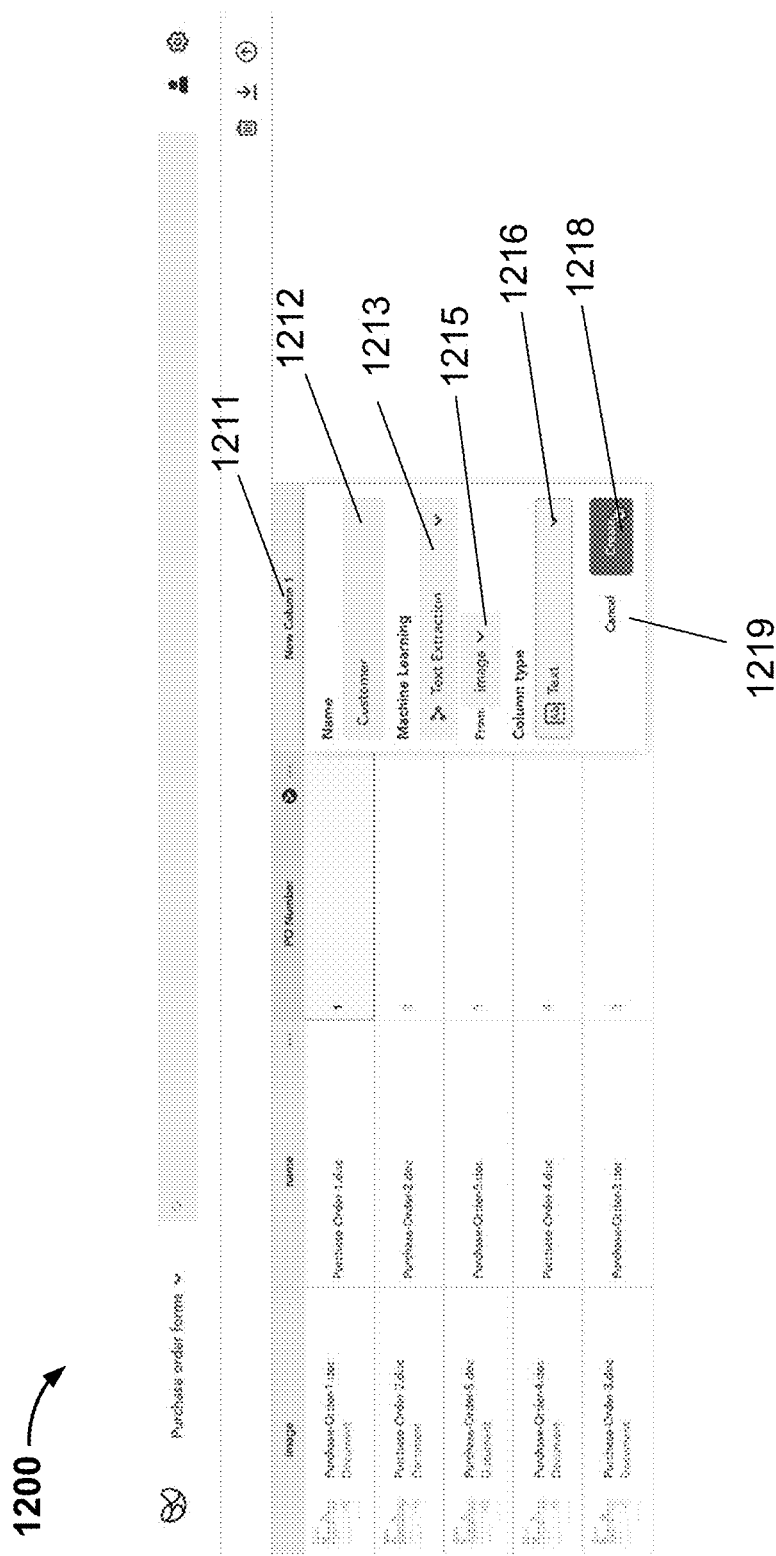
FIG. 12 depicts a screenshot of an embodiment that shows a display wherein the user has entered a set of specifications or parameters for the creation of a new column.

Continuing with the present example, FIG. 12 depicts a screenshot 1200 of an embodiment that shows a display wherein the user has entered a set of specifications or parameters for the creation of a new column (e.g., shown at 1211). In particular, as shown in FIG. 12, the user has specified or entered "Customer" as the Column name (e.g., shown at 1212), and has selected "Text extraction" (e.g., shown at 1213) as the machine learning algorithm for the extraction of the target field from the dropdown menu. FIG. 12 also shows that the text will be extracted from an image of the file (e.g., shown at 1215), which has been selected as the source of the extraction via a dropdown menu. Although not shown in this example, the user can select another representation or processed version of the file as a source for the extraction algorithm (or other selected machine learning algorithm) using the dropdown menu. The column type is selected as "Text" (e.g., shown at 1216), since the system will be extracting a customer name from the purchase orders. To complete the process of creating a new column, the user clicks a selection element or button "Create" (e.g., shown at 1218). Note that there is also an option to "Cancel" (e.g., shown at 1219) in the case where the user wishes to cancel the process of creating a new column.

After the user has created a new column, which in this case is a "Customer" column for extracting the customer names from the purchase orders, the system is ready to receive an indication or example of the target field as specified by the user. As in the case of extracting purchase order numbers to populate the "PO Number" column described with respect to FIG. 8, in this case the user can click on an empty cell under the newly created "Customer" column in order to view the image of the file associated with the row of the selected empty cell.

Figure 13:
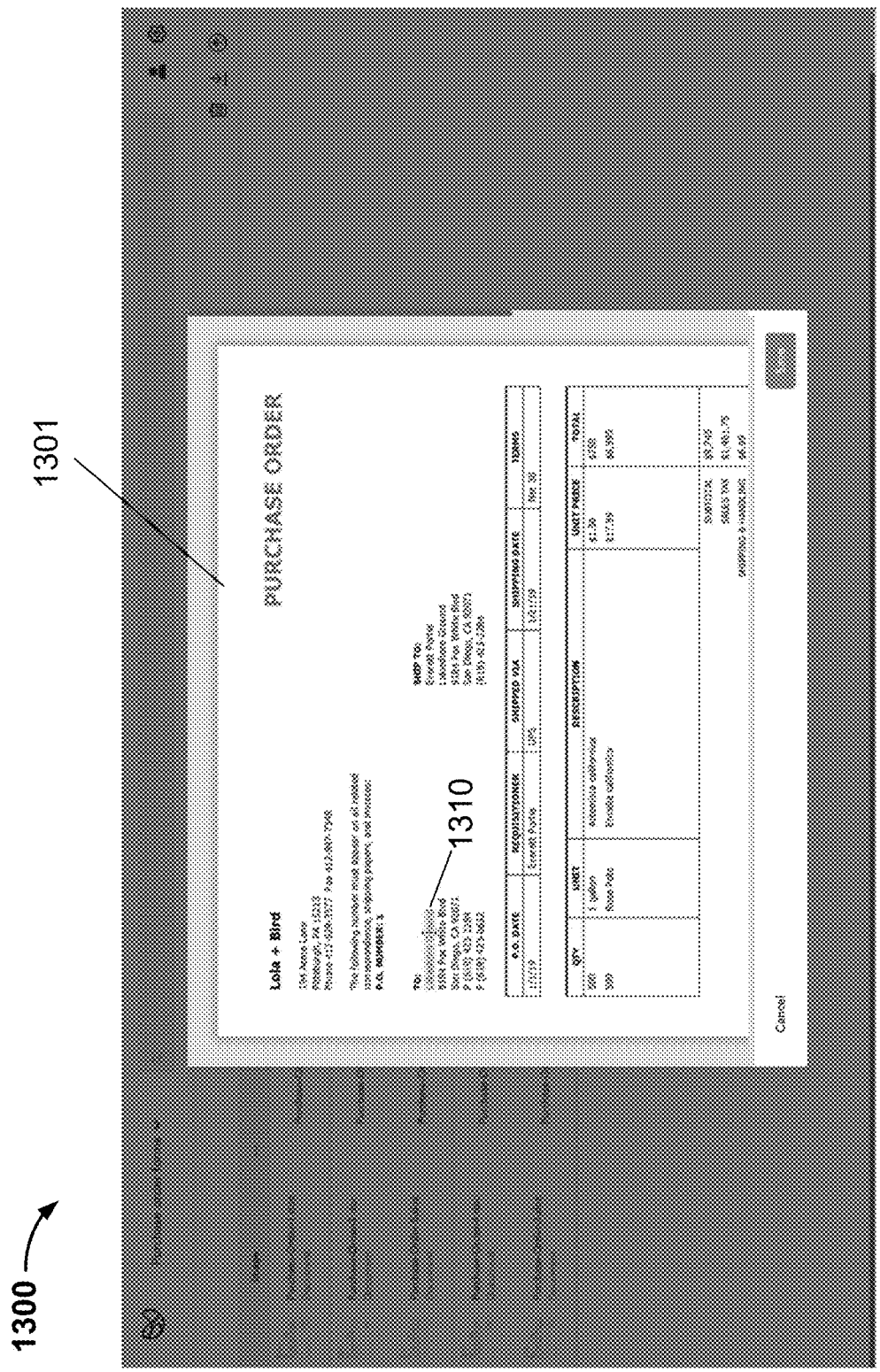
FIG. 13 depicts a screenshot of an embodiment that shows a display of an image of a file in response to the user's selection of an empty cell as described with respect to FIG. 12.

FIG. 13 depicts a screenshot 1300 of an embodiment that shows a display of an image 1301 of a file in response to the user's selection of an empty cell in the newly created "Customer" column as described with respect to FIG. 12. As in the previous case, because the empty cell selected in the first row of files is associated with the file "Purchase-Order-1.doc," the system displays the image of Purchase-Order-1.doc (e.g., shown at 1301). In this case as in the previous case, the image 1301 has been pre-processed (e.g., run through an OCR program to permit text searching and extraction), which enables the user to select or highlight a portion of the image to specify the target field. The user identifies the customer name by highlighting (e.g., shown at 1310) the customer name as it appears in the image 1301. In this manner, the user can specify or define a ground truth specification of the target field (e.g., value corresponding to the Customer) by identifying and highlighting the actual target field (e.g., "Lakeshore Ground" shown at 1310) on a particular image. Once the user highlights a selected portion of text in an image (e.g., "Lakeshore Ground" shown at 1310) thereby designating the selected portion of text as a ground truth specification of the target field, the system receives the ground truth specification of the target field and the associated file (in this case, Purchase-Order-1.doc) becomes a ground truth file for that target field (in this case, the value corresponding to the Customer).

As in the case of populating the PO Number column with predicted specifications of purchase order numbers as described with respect to FIGS. 10 and 11, in this case, the system has received for at least one of the files (in this case, Purchase-Order-1.doc), a ground truth specification of the target field (e.g., "Lakeshore Ground" shown at 1310) so that the file Purchase-Order-1.doc becomes a ground truth file. Once the ground truth specification of the target field has been received for at least one of the files so that the file becomes a ground truth file, the system trains the model in response to receiving the ground truth specification of the target field.

In some cases, the system trains the model according to the preferences as specified by the user with respect to model training. In this case, the user selected "Text extraction" as the machine learning algorithm (e.g., shown at 1213 of FIG. 12). Accordingly, in this example, the system applies a text extraction machine learning algorithm to predict an output or predicted specification for the target field (in this case, the value corresponding to the Customer) for each of the other files in the corpus of files. The system then receives from the model a predicted specification of the target field for at least one of the other files in the corpus of files so that the file becomes a predicted file. Finally, as shown in FIG. 14, the system displays the ground truth specification "Lakeshore Ground" (e.g., shown at 1401) associated with the ground truth file Purchase-Order-1.doc and the predicted specification associated with the predicted file.

Figure 14:
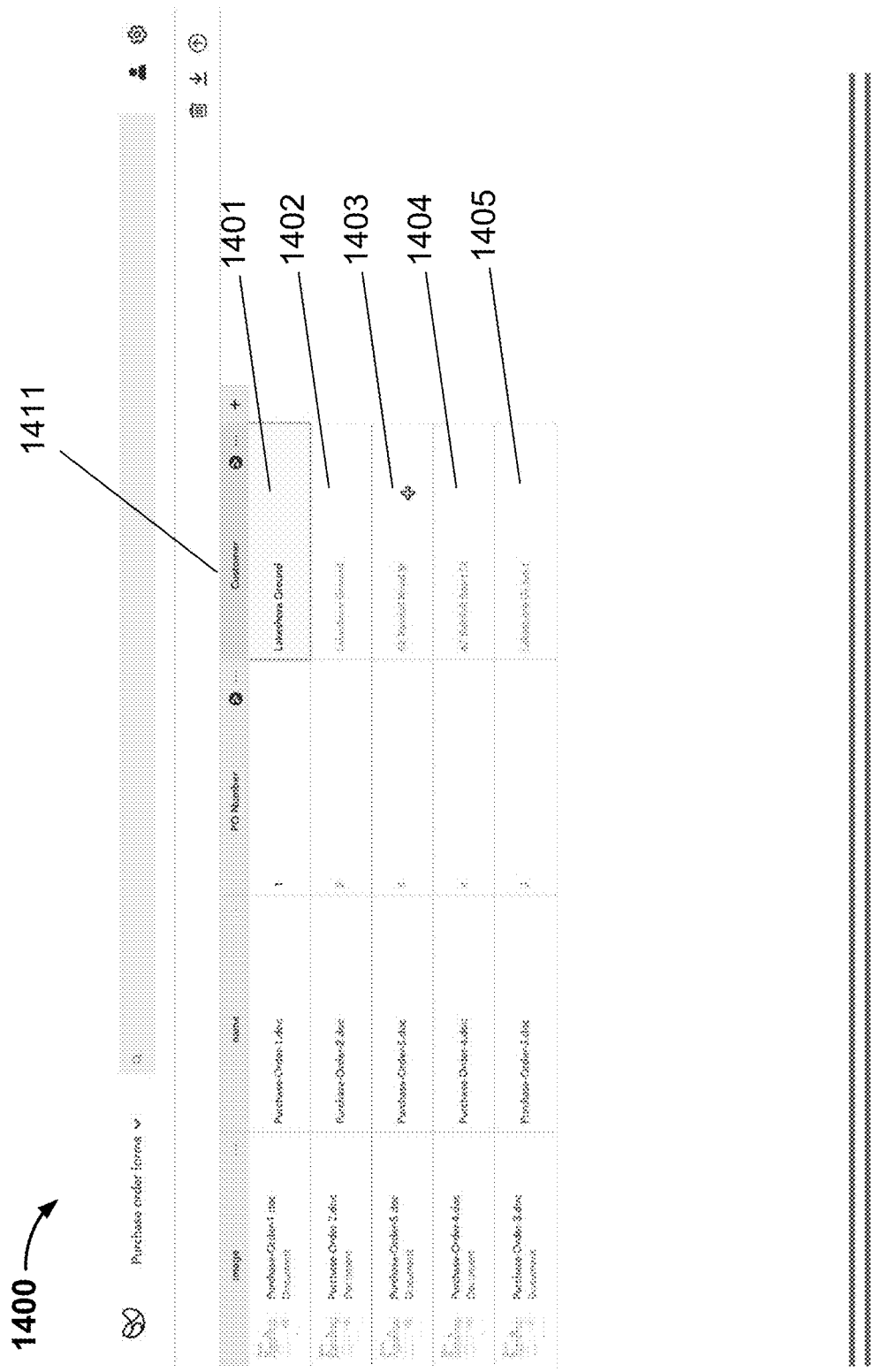
FIG. 14 depicts a screenshot of an embodiment that shows a display of the newly created Customer column with ground truth specification and predicted specifications of the target field.

FIG. 14 depicts a screenshot 1400 of an embodiment that shows a display of the newly created Customer column with ground truth specification and predicted specifications of the target field, which in this case, is the customer for each of the files. In particular, the newly created column has a heading "Customer" (e.g., shown at 1411), and as shown in FIG. 14, the ground truth specification associated with the ground truth file is displayed (e.g., shown at 1401) along with the predicted specification associated with each of the predicted files. In this case, the predicted specification of "Lakeshore Ground" (e.g., shown at 1402) is extracted and displayed from the predicted file Purchase-Order-2.doc, the predicted specification of "62 Rainfall Road St" (e.g., shown at 1403) is extracted and displayed from the predicted file Purchase-Order-5.doc, the predicted specification of "62 Rainfall Road St" (e.g., shown at 1404) is extracted and displayed from the predicted file Purchase-Order-4.doc, and the predicted specification of "Lakeshore Ground" (e.g., shown at 1405) is extracted and displayed from the predicted file Purchase-Order-3.doc.

As shown in FIG. 14, the files have been reordered or resorted to appear in a different order than when the files were first loaded into the system. In some cases, the system is configured to provide an ability to sort or reorder the files according to certain criteria. For example, the results (e.g., output of the models in the form of predicted specifications) may appear in order of highest to lowest confidence level, such that the predictions having a greater or higher confidence are displayed in rows above predictions having a lower confidence level. In some embodiments, the system provides an ability to sort the order in which the predicted specifications and the predicted files appear depending on criteria set automatically by the system or chosen by the user.

The interface provided in the disclosed technique and as shown in the embodiment of FIG. 14 also provides an ability to view the model results (e.g., the predicted specifications of each target field in each column) allowing the user to quickly identify and determine which predictions are likely to be erroneous. In the example shown, it is readily apparent from viewing the model results shown in FIG. 14 that the model's prediction of "62 Rainfall Road St" does not correspond to a customer, but rather to an address. As discussed in more detail below, the disclosed technique provides an ability for the user to re-label or correct the model's prediction and uses the user's feedback and interactions to retrain its models in real time.

In particular, in some embodiments, the method further comprises: receiving a ground truth specification for the predicted file so that the predicted file becomes a new ground truth file; retraining the model in response to receiving the ground truth specification for the predicted file; receiving from the retrained model a predicted specification of the target field for at least one of the other files in the corpus of files so that the file becomes a predicted file based at least in part on the retrained model; and displaying the ground truth specification associated with the new ground truth file and the predicted specification received from the retrained model associated with the predicted file.

Figure 15:
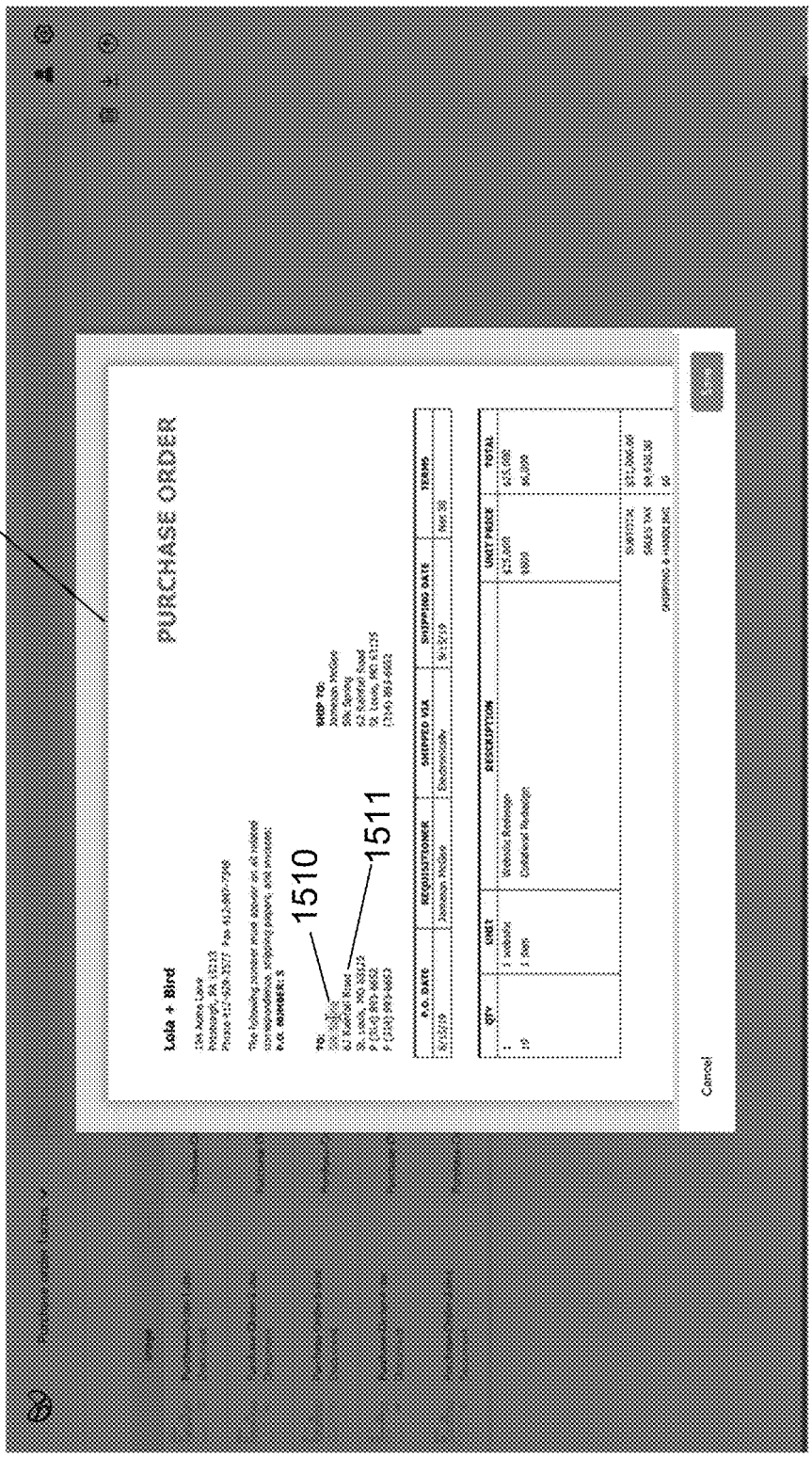
FIG. 15 depicts a screenshot of an embodiment that shows a display of an image of the file in response to the user's selection of a cell having a predicted specification.

Returning to FIG. 14 and the present example, having identified the predicted specification of "62 Rainfall Road St" as a likely error, the user can select or click on the cell containing the erroneous prediction (e.g., shown at 1403) which will open the image of the corresponding file (in this case, Purchase-Order-5.doc) as shown in FIG. 15.

FIG. 15 depicts a screenshot 1500 of an embodiment that shows a display of an image 1501 of the file (in this case, Purchase-Order-5.doc) in response to the user's selection of the cell having the predicted specification of "62 Rainfall Road St" (e.g., shown at 1403 of FIG. 14). In this case, because the selected cell is associated with the file "Purchase-Order-5.doc," the system displays the image of Purchase-Order-5.doc (e.g., shown at 1501). The image 1501 has been pre-processed (e.g., run through an OCR program to permit text searching and extraction), which enables the user to select or highlight a portion of the image to specify the target field.

Taking a look at FIG. 15, it is apparent that the algorithm identified and extracted the wrong value for the customer name by selecting "62 Rainfall Road" (e.g., shown at 1511) and also added the term "St" to its initial predicted specification for the file "Purchase-Order-5.doc."

An advantage of the disclosed technique is that it allows the user to correct for such a prediction error by selecting the correct customer name as it appears in the image. In this case, the user highlights "Silk Spring" (e.g., shown at 1510) thereby specifying or defining a ground truth specification of the target field (e.g., value corresponding to the Customer) by identifying and highlighting the actual target field (e.g., "Silk Spring" shown at 1510). The system receives this ground truth specification for the predicted file (in this case, Purchase-Order-5.doc) so that the predicted file Purchase-Order-5.doc becomes a new ground truth file for the target field (in this case, the value corresponding to Customer). The system retrains the model (e.g., Text extraction model) in response to receiving the ground truth specification (e.g., "Silk Spring" shown at 1510) for the predicted file Purchase-Order-5.doc. A predicted specification of the target field is then received from the retrained model for at least one of the other files in the corpus of files so that the file becomes a predicted file based at least in part on the retrained model. The ground truth specification associated with the new ground truth file and the predicted specification received from the retrained model associated with the predicted file are displayed as shown in FIG. 16.

Figure 16:
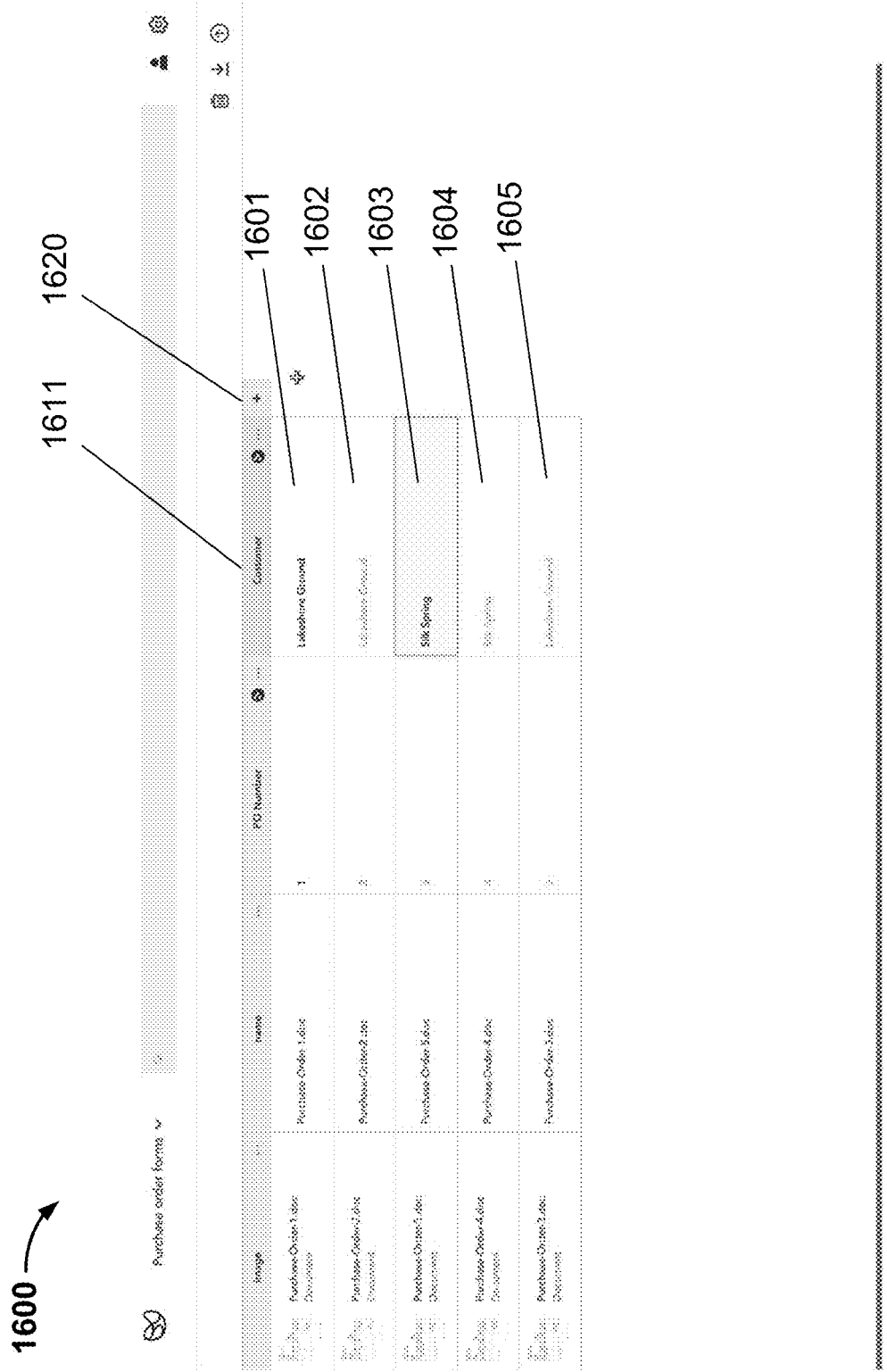
FIG. 16 depicts a screenshot of an embodiment that shows an updated display of the Customer column from applying a retrained model.

FIG. 16 depicts a screenshot 1600 of an embodiment that shows an updated display of the Customer column with ground truth specifications for the initial ground truth file Purchase-Order-1.doc and the new ground truth file Purchase-Order-5.doc and predicted specifications of the target field from applying the retrained model based on both the initial and the new ground truth files.

As shown in FIG. 16, the updated display of the Customer column (e.g., heading shown at 1611), still shows the initial ground truth specification "Lakeshore Ground" extracted from the ground truth file Purchase-Order-1.doc (e.g., shown at 1601) along with the predicted specification associated with each of the predicted files. FIG. 16 also shows the new ground truth specification "Silk Spring" extracted from the new ground truth file Purchase-Order-5.doc (e.g., shown at 1603).

In this example, the system retrains the model (e.g., Text extraction model) in response to receiving the new ground truth specification "Silk Spring" (e.g., shown at 1603) for the new ground truth file Purchase-Order-5.doc. Predicted specifications of the target field are received from the retrained model for the other files in the corpus of files so that each of the files having a predicted specification becomes a predicted file based at least in part on the retrained model. In particular, the predicted specification of "Lakeshore Ground" (e.g., shown at 1602) based on the retrained model is extracted and displayed from the predicted file Purchase-Order-2.doc, the predicted specification of "Silk Spring" (e.g., shown at 1604) based on the retrained model is extracted and displayed from the predicted file Purchase-Order-4.doc, and the predicted specification of "Lakeshore Ground" (e.g., shown at 1605) based on the retrained model is extracted and displayed from the predicted file Purchase-Order-3.doc. Note that, based on the retrained model and the user's interactive feedback to the system by correcting the erroneous prediction of "62 Rainfall Road St" to set a new ground truth specification of "Silk Spring" (e.g., shown as selected by the user at 1510 of FIG. 15), the system has successfully corrected its previous predicted specification of "62 Rainfall Road St" to "Silk Spring" from the predicted file Purchase-Order-4.doc based on the retrained model. In this way, a user can provide further training to the models with each and every user interaction and the system can learn from user interactions to provide improved predictions.

In some embodiments, the system re-calculates its predicted specifications and updates the display of predicted specifications in real time or near real time. In some examples, displaying the ground truth specification associated with the ground truth file and the predicted specification associated with the predicted file is updated in real time. In some cases, where the system provides updated predicted specifications based on a retrained model, the system also re-calculates the confidence levels associated with each of its predictions (e.g., each of the updated predicted specifications). Accordingly, not only are the predicted specifications adjusted in response to retraining the model based on interactive user feedback (e.g., replacing an erroneous predicted specification with a new ground truth specification), but the confidence levels associated with the predicted specifications are also adjusted in response to the interactive user feedback. In some embodiments, the system will train a model based on a first received ground truth specification and will retrain the model in response to receiving a subsequent ground truth specification by retraining the model on all labeled files (i.e., taking into account all ground truth specifications). Labels can be given the same weight (e.g., each ground truth specification is weighed equally) or different weights based on other factors (e.g., recency). Additionally, in the case where labels are given different weights, threshold values may be set to select the use of labels that exceed a certain minimum weight.

User feedback and interactions with the system can take many forms. In some cases, an operation is received on the target field. For instance, a user might select a field or a cell in a table and apply an operation to that field or cell. Depending on the operation, information regarding the type of value (e.g., text or number) can be inferred from the user's action. In other cases, metadata associated with the target field is received. The metadata can be used by the system to make other inferences about the target field. In some examples, the system is configured to request metadata associated with the target field. In such cases, the system may prompt the user to provide additional information and can use that information to further train the models and improve its predictions. For example, the system can prompt the user as to whether a numerical value is currency and what type of currency. The system is able to acquire more training data from the user by tracking the user's activities and interactions with the data (e.g., the user may export the data to an excel spreadsheet). Rather than require the user to provide a large amount of data for training upfront, the system is collecting data interactively as the user engages with the system.

A file can be deleted from the corpus of files. Deleting a file can have the effect of simply removing the file from the display of the corpus of files, but the system can be configured to retain the file or any information extracted from the file for purposes of model training and prediction. Similarly, a column can be deleted from the corpus of files. Columns are independent of each other. Thus, deleting a column has the effect of removing all of the data within that column.

Figure 17:
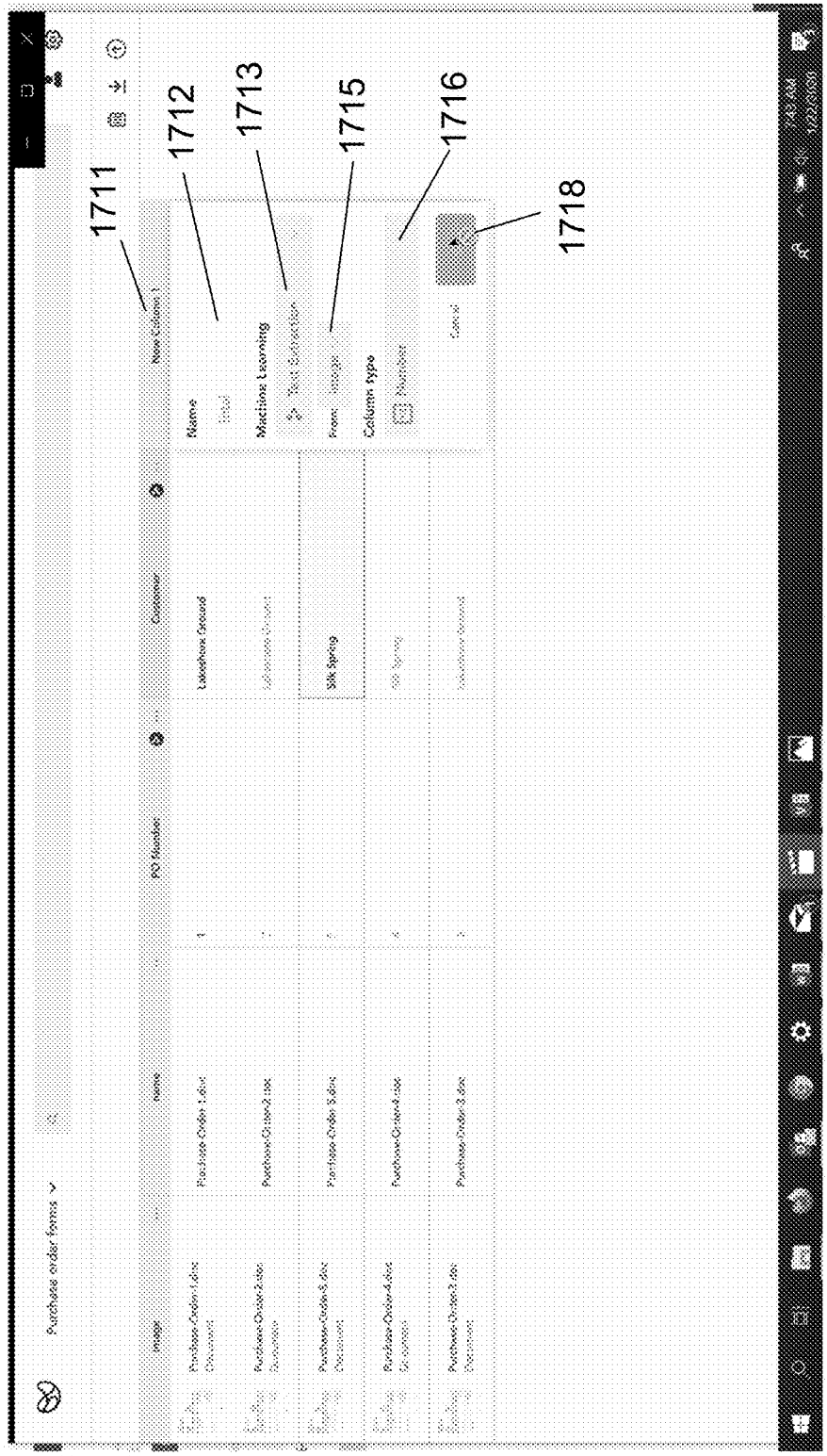
FIG. 17 depicts a screenshot of an embodiment that shows a display wherein the user has entered a set of specifications or parameters for the creation of a new column to extract invoice totals from purchase orders.

Returning to the present example, FIG. 17 depicts a screenshot 1700 of an embodiment that shows a display wherein the user has entered a set of specifications or parameters for the creation of a new column (e.g., shown at 1711) in order to extract invoice totals from the purchase orders. In particular, as shown in FIG. 17, the user has specified or entered "Total" as the Column name (e.g., shown at 1712), and has selected "Text extraction" (e.g., shown at 1713) as the machine learning algorithm for the extraction of the target field from the dropdown menu. FIG. 17 also shows that the text will be extracted from an image of the file (e.g., shown at 1715), which has been selected as the source of the extraction via a dropdown menu. The column type is selected as "Number" (e.g., shown at 1716), since the system will be extracting a numeric invoice total from the purchase orders. To complete the process of creating a new column, the user clicks a selection element or button "Create" (e.g., shown at 1718).

After the user has created a new column, which in this case is a "Total" column for extracting the invoice totals from the purchase orders, the system is ready to receive an indication or example of the target field as specified by the user. As in the cases of extracting purchase order numbers to populate the "PO Number" column and customer names to populate the "Customer" column, in this case the user can click on an empty cell under the newly created "Total" column in order to view the image of the file associated with the row of the selected empty cell.

Figure 18:
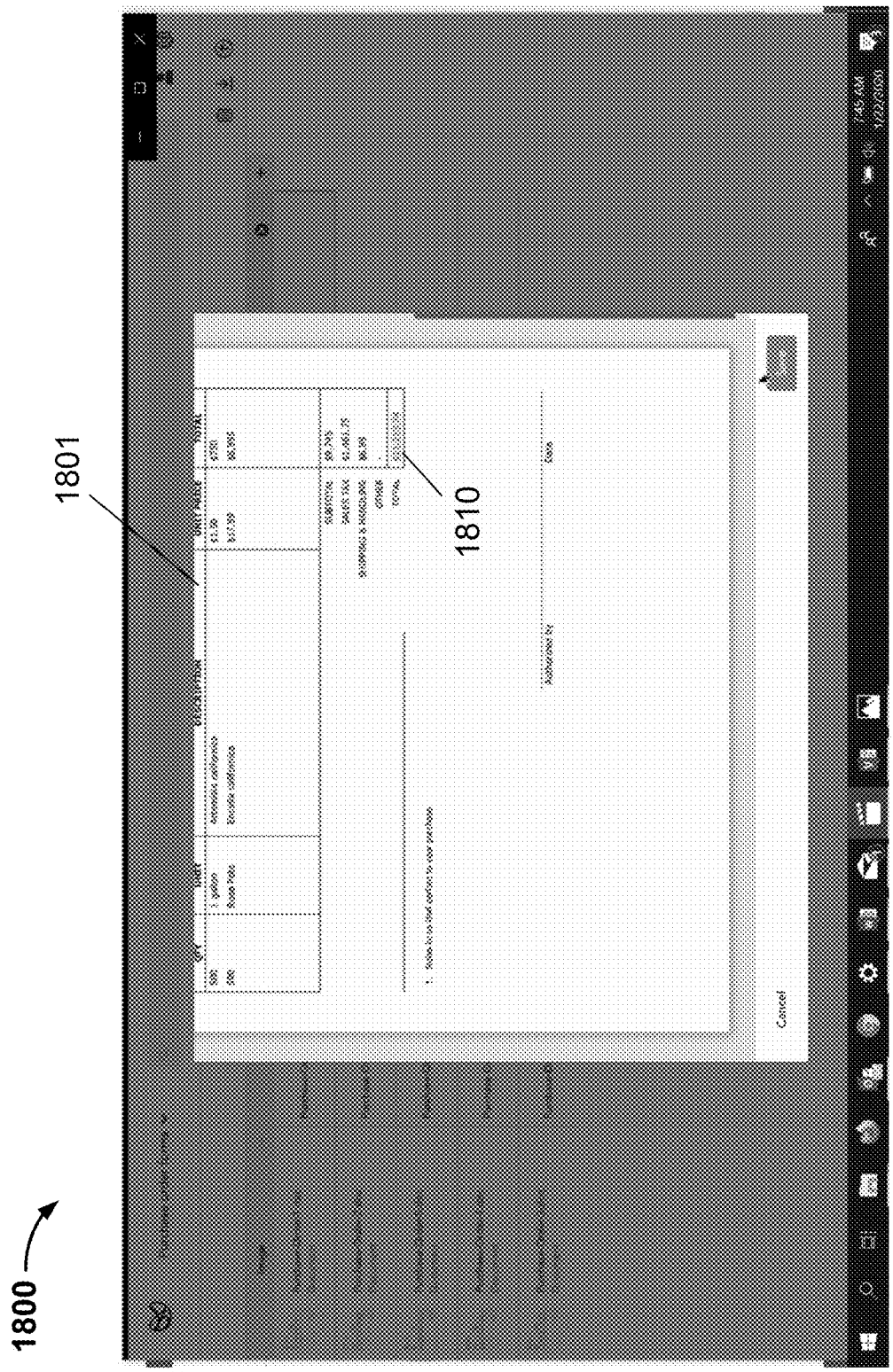
FIG. 18 depicts a screenshot of an embodiment that shows a display in response to the user's selection of an empty cell under the "Total" column.

FIG. 18 depicts a screenshot 1800 of an embodiment that shows a display in response to the user's selection of the empty cell under the "Total" column as described above. Here, the system displays the image of Purchase-Order-1.doc (e.g., shown at 1801) where the user has scrolled down the page to the bottom of the image to find the invoice total. As described above, the image 1801 has been pre-processed (e.g., run through an OCR program to permit text searching and extraction), which enables the user to select or highlight a portion of the image to specify the target field.

In the example shown in FIG. 18, the user identifies the invoice total by highlighting (e.g., shown at 1810) the invoice total as it appears in the image 1801. In this manner, the user specifies or defines a ground truth specification of the target field (in this case, the value corresponding to the invoice total) by identifying and highlighting the actual target field (e.g., "$11,213.74" shown at 1810) on the image associated with Purchase-Order-1.doc. Once the user highlights a selected portion of text in this image (e.g., "$11,213.74" shown at 1810) thereby designating the selected portion of text as a ground truth specification of the target field, the system receives the ground truth specification of the target field and the associated file (in this case, Purchase-Order-1.doc) becomes a ground truth file for that target field (in this case, the value corresponding to the invoice total).

As in the case of populating the PO Number and Customer columns with predicted specifications of purchase order numbers and customer names respectively as described above, in this case, the system has received for at least one of the files (in this case, Purchase-Order-1.doc) a ground truth specification of the target field (e.g., "$11,213.74" shown at 1810) so that the file Purchase-Order-1.doc becomes a ground truth file for this target field (e.g., corresponding to the value of invoice total). Once the ground truth specification of the target field has been received for at least one of the files so that the file becomes a ground truth file, the system trains the model in response to receiving the ground truth specification of the target field.

In some cases, the system trains the model according to the preferences as specified by the user with respect to model training. In this case, the user selected "Text extraction" as the machine learning algorithm (e.g., shown at 1713 of FIG. 17). Accordingly, in this example, the system applies a text extraction machine learning algorithm to predict an output or predicted specification for the target field (in this case, the value corresponding to the invoice total) for each of the other files in the corpus of files. The system then receives from the model a predicted specification of the target field for at least one of the other files in the corpus of files so that the file becomes a predicted file. Finally, as shown in FIG. 19, the system displays the ground truth specification associated with the ground truth file and the predicted specification associated with the predicted file.

Figure 19:
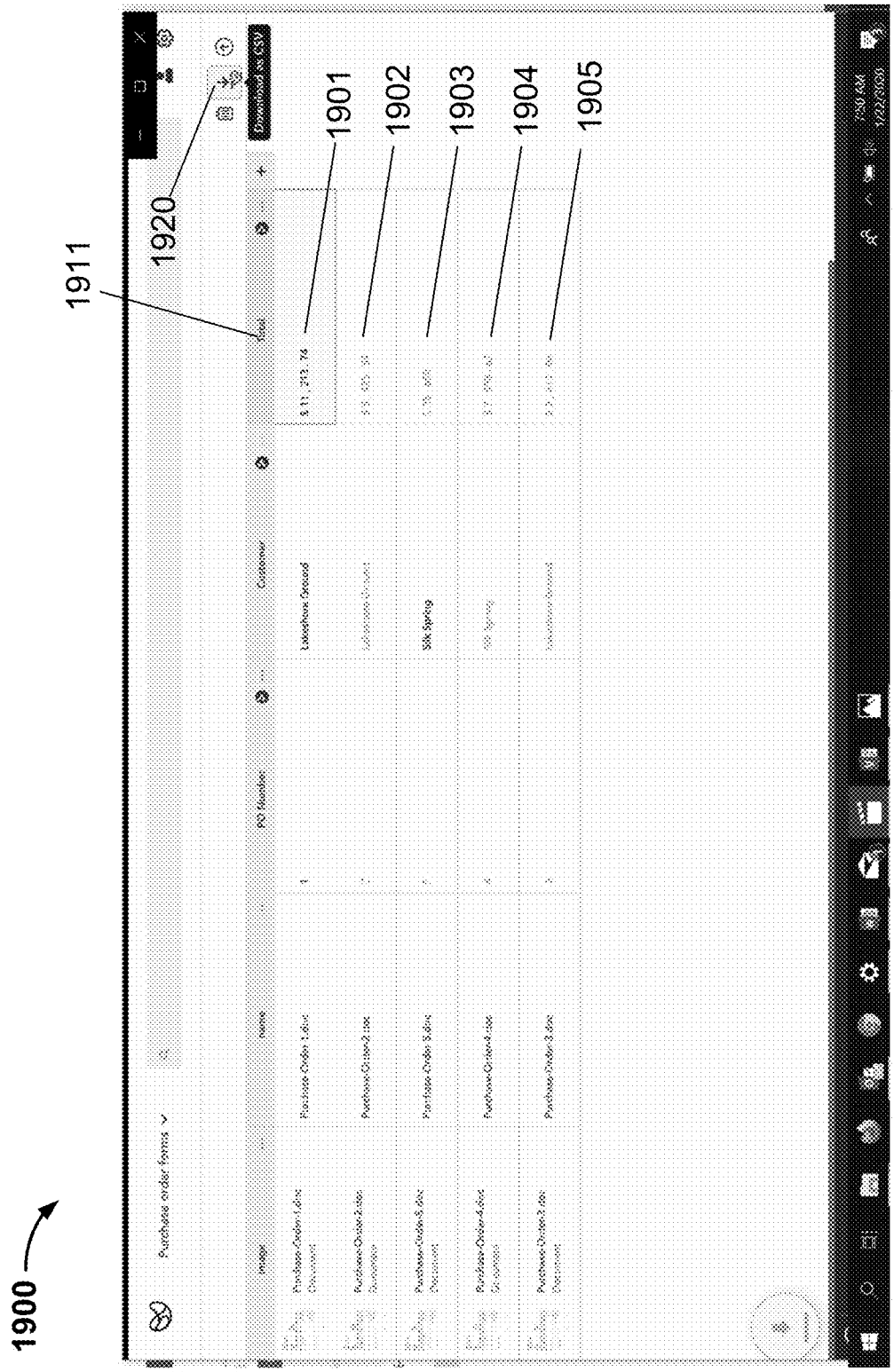
FIG. 19 depicts a screenshot of an embodiment that shows a display of the newly created Total column.

FIG. 19 depicts a screenshot 1900 of an embodiment that shows a display of the newly created Total column with ground truth specification and predicted specifications of the target field, which in this case, is the invoice total for each of the files. In particular, the newly created column has a heading "Total" (e.g., shown at 1911). The ground truth specification "$11,213.74" associated with the ground truth file is displayed (e.g., shown at 1901) along with the predicted specification associated with each of the predicted files. In the example shown, the predicted specification of "$5,425.54" (e.g., shown at 1902) is extracted and displayed from the predicted file Purchase-Order-2.doc, the predicted specification of "$35,650" (e.g., shown at 1903) is extracted and displayed from the predicted file Purchase-Order-5.doc, the predicted specification of "$7,553.62" (e.g., shown at 1904) is extracted and displayed from the predicted file Purchase-Order-4.doc, and the predicted specification of "$3,413.04" (e.g., shown at 1905) is extracted and displayed from the predicted file Purchase-Order-3.doc.

Figure 20:
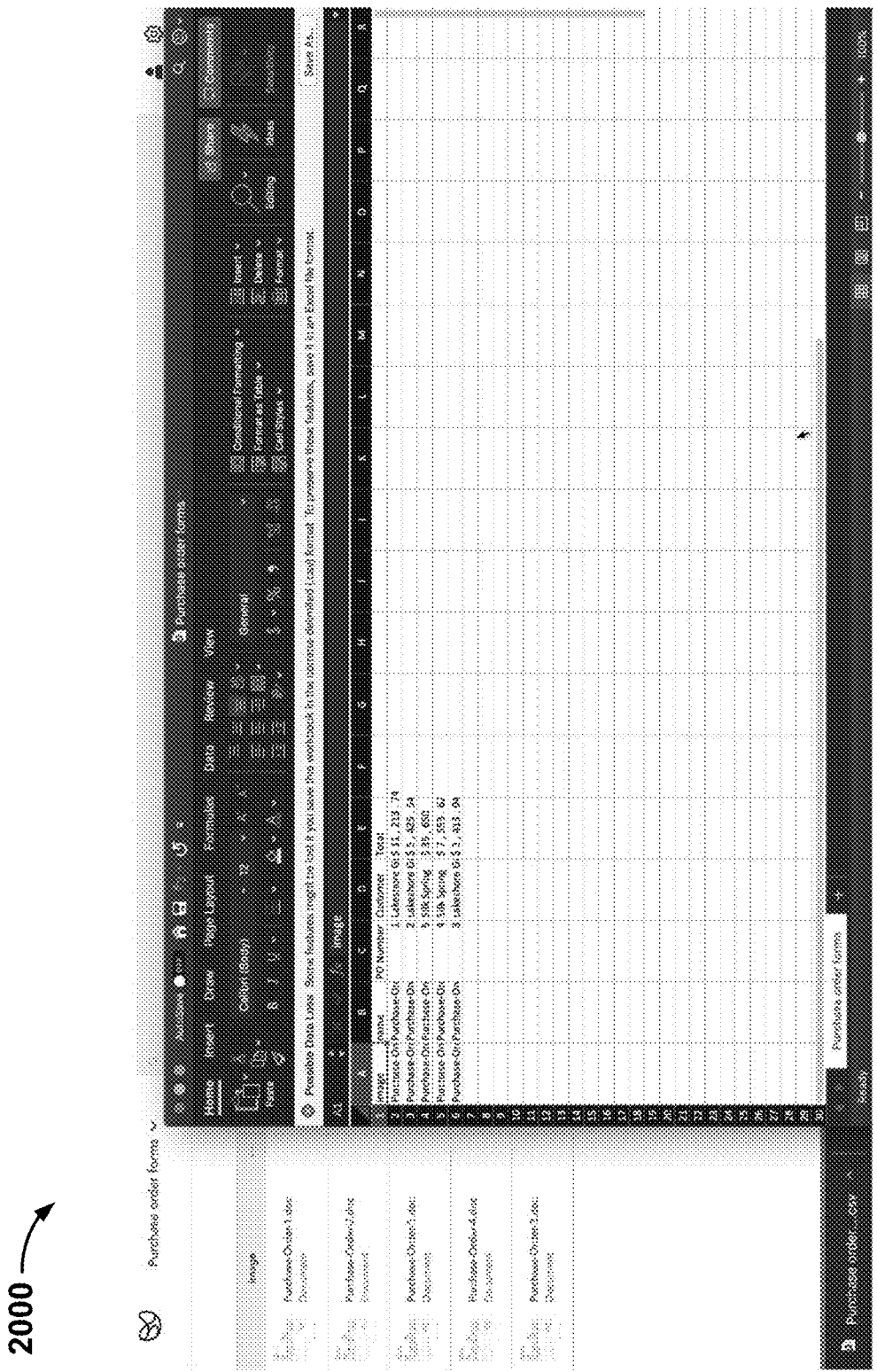
FIG. 20 depicts a screenshot of an embodiment that shows a display of the values of the table as downloaded into another application.

The disclosed technique for interactive model training and prediction generation as described herein also provides an ability to transfer or download the model or system outputs (e.g., values of target fields) to other systems or applications for display or further processing. As an example, the display shown in FIG. 9 includes a selection element or download button (e.g., shown at 1920). A user can select or click on the download button to download the values in the table generated by the system as described herein. FIG. 20 depicts a screenshot 2000 of an embodiment that shows a display of the values of the table as downloaded into another application.

As described with respect to the examples above, the disclosed system is configured to provide real time feedback from a machine learning system and interactive training of machine learning models. In particular, models are retrained in response to user interactions. This model training process is made possible at least in part by separating processing and analysis using static and dynamic models that are trained differently. The disclosed technique enables interactive training and prediction of machine learning models to increase the speed of generating new predictions based on real time feedback. In some cases, a dynamic model is applied to the output of a static model to generate an analysis, a correction of the analysis is received, and the correction is used to retrain the dynamic machine learning model. An updated analysis is generated based on reapplying the dynamic model to the output of the static model without having to retrain the static model.

Figure 21:
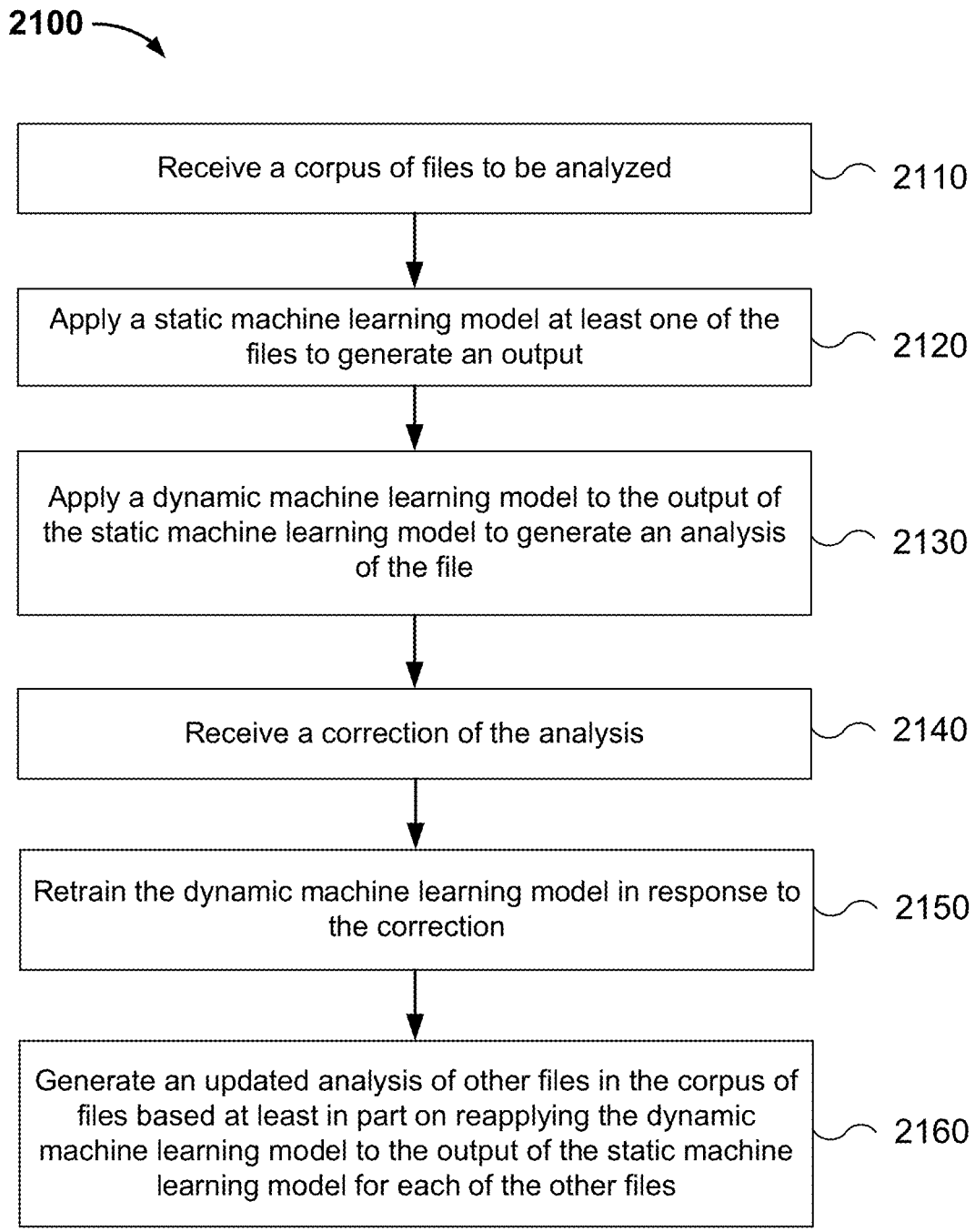
FIG. 21 is a flowchart of an embodiment of a method for providing real time feedback from a machine learning system that can be performed by the exemplary system depicted in FIG. 1.

FIG. 21 is a flowchart of an embodiment of a method 2100 for providing real time feedback from a machine learning system that can be performed by the exemplary system 100 depicted in FIG. 1.

As shown in FIG. 21, a method 2100 for interactive model training and prediction generation includes receiving a corpus of files to be analyzed at 2110 and applying a static machine learning model at least one of the files to generate an output at 2120. At 2130, a dynamic machine learning model is applied to the output of the static machine learning model to generate an analysis of the file. A correction of the analysis is received at 2140 and the dynamic machine learning model is retrained in response to the correction at 2150. At 2160, the method includes generating an updated analysis of other files in the corpus of files based at least in part on reapplying the dynamic machine learning model to the output of the static machine learning model for each of the other files.

In some examples and as described above, at least some of the files have a target field. The analysis of the file is based at least in part on a ground truth file generated in response to receiving a ground truth specification of the target field for the ground truth file. In some cases, the analysis of the file comprises a predicted specification based at least in part on a ground truth file generated in response to receiving a ground truth specification of the target field for the ground truth file.

In some embodiments, receiving a correction of the analysis includes receiving a ground truth specification for the predicted file so that the predicted file becomes a new ground truth file. In some cases, retraining the dynamic machine learning model in response to the correction includes retraining the dynamic machine learning model in response to receiving the ground truth specification for the predicted file. Additionally, generating an updated analysis of other files in the corpus of files based at least in part on reapplying the dynamic machine learning model to the output of the static machine learning model for each of the other files includes receiving from the retrained dynamic machine learning model a predicted specification of the target field for at least one of the other files in the corpus of files so that the file becomes a predicted file based at least in part on the retrained dynamic machine learning model.

Here, by separating processing and analysis using static and dynamic models that are trained differently, the disclosed technique enables interactive training and prediction of machine learning models to increase the speed of generating new predictions based on real time feedback. For example, certain tasks that can be performed ahead of time are pre-calculated and pre-processed to generate a static model that does not require retraining while other tasks (e.g., tasks requiring computation that is custom to the problem being solved) are performed as needed (e.g., in real time) to generate or update a dynamic model that is subject to retraining.

For instance, applying a static machine learning model at least one of the files to generate an output includes completing pre-processing steps that can be completed or pre-calculated in advance or ahead of time as opposed to in real time or in response to a user interaction with the system. For example, in the case where a face recognition algorithm is used to extract features from a file, certain computationally expensive pre-processing steps can be performed to train the static models ahead of time. These pre-processing steps include finding or detecting all of the faces in an image and encoding or embedding each of the faces to extract important facial attributes and dimensions. Aspects such as embedding are pre-calculated in a static modeling process using algorithms that are trained based on millions of images and the static models are not retrained in real time or in response to user interaction with the system in real time.

In contrast, certain aspects are calculated or computed in real time in response to user interaction (e.g., training by labeling or re-labeling target fields, adding or deleting information, responding to queries, providing metadata). In the example of face recognition, applying a dynamic machine learning model to the output of the static machine learning model to generate an analysis of the file includes applying a distance function to find which faces are the closest match (e.g., based on a ground truth specification for a target field). In this case, applying the dynamic model includes calculating what is sufficiently close, a task that can be done quickly in response to a user interaction and in real time because the other aspects required for face recognition have already been completed during pre-processing and training of the static model. Accordingly, real time training of the dynamic model can be performed while leaving the static model-used to embed the faces-alone. Moreover, as a user continues to interact with the system and provide more information useful for improved prediction and inferences (e.g., through labeling and re-labeling to provide more ground truth to the system), the dynamic model is updated or retrained very quickly and the display is also updated very quickly or in real time. In this way, with pre-calculation and pre-processing to train the static models and by eliciting feedback from the user at the right times, the system integrates the training and inference processes to provide interactive machine learning mechanisms that enable real time predictions (e.g., predicted specifications of target fields) in response to receiving small amounts of data.

In some embodiments, applying a static machine learning model comprises pre-processing the corpus of files to be analyzed. During pre-processing, after storing the files in their originally received form once they have been selected and downloaded by the user, the files are normalized and the normalized files are stored by the system. One purpose of normalization is to put the files in a form so as to enable applying or running algorithms. For example, files are normalized into a format for processing by computer vision algorithms. How the files are normalized depends on the file type (e.g., word document versus a photo or image). In some cases, normalizing the files includes splitting the pages of a file into a number of pdf files.

The system has the ability to identify data or file type and format and to normalize the files regardless of the initial type or format in which the file is received. One advantage of the disclosed technique is that the system is able to process arbitrary data types and perform different tasks while maintaining the same interface to the user such that the user experience and in particular, the ease of training and retraining models and updating model results and predictions in real time remains the same regardless of data type, file format, or which machine learning algorithm is being used.

In some cases, pre-processing includes running a machine learning algorithm on the normalized files. Different algorithms can are used for feature finding and extraction. These include but are not limited to image classification algorithms to identify objects in an image, OCR for text extraction, face detection algorithms for detecting location and important attributes of faces, color recognition/analysis algorithms, and gender recognition algorithms. In some embodiments, the system is configured to run object detection, OCR, and face recognition algorithms on the normalized files.

Running the algorithm depends on the file type. In some cases, the algorithms are run differently depending on the type of the normalized file. For example, in the case of a video versus a word document, an algorithm can be run on each image of a word doc, on each frame of a video, on every x number of frames of a video—and the results can be combined after running the algorithm on each of these pieces. Thus, the same algorithms can be run on different files but are run differently depending on the file type.

In some cases, the results generated in the pre-processing steps as described herein (e.g., normalized files and extracted features) are recombined and stored in the database such that they remain associated with the original file that was downloaded. For example, in some cases, given a word document with ten different pages, the system runs OCR on each page separately but upon recombining the normalized files that have been run through OCR, the system stores the feature information (e.g., location of words in the normalized files) by associating it with one file (e.g., the original file) rather than ten files (e.g., the normalized files). For each of the algorithms run by the system, results are stored in the database and are associated with the original file that was downloaded. Some results generated in the pre-processing steps are attributes of the file and can be used for search purposes. These attributes can also be used in the dynamic part of the algorithm or pipeline to generate the dynamic model.

Pre-processing can also include performing computations required to apply a particular machine learning algorithm. For example, certain operations are performed or pre-calculated and features extracted for each file that is pre-processed. In some examples, each feature is extracted and scored and the scores from the individual features are combined to generate a combined score. The combined score can be compared to a threshold to return a result. In some cases, the result is a predicted specification. For example, in the case where more than one prediction has a combined score higher than a given threshold generating several possible candidates for a result, the result that is returned is selected as the prediction having the highest combined score of all the candidates.

In some embodiments, pre-processing includes tasks identified as unlikely to change in response to new information. As an example, the process of running OCR on a file or converting a file from one format to another (e.g., conversion of a word document to a pdf format) does not change in response to receiving real time feedback or interaction from a user. Similarly, at least some aspects of object detection or face recognition algorithms can be performed as part of pre-processing and training of the static machine learning model. Accordingly, tasks identified as unlikely to change in response to new information (e.g., OCR, format conversion, aspects of object detection and face recognition) are performed as part of pre-processing the corpus of files to be analyzed.

Once the pre-processing static steps (e.g., running the algorithms on the normalized files) are completed, the results are available for training and prediction of the dynamic model. For example, if a column corresponding to a target field exists and a model has been applied based on a ground truth specification, the system automatically generates a prediction for the target field on any new file that is selected and downloaded into the application as soon as the pre-processing steps have been performed on the new file. Additionally, once pre-processing is complete on a downloaded file, the user may access the file and label it (e.g., specify a ground truth specification for a target field). This labeling by the user initiates new training of the dynamic models. Accordingly, every time a user provides a label or re-labels a file by changing a previous label or a predicted specification into a ground truth specification, the system will retrain the dynamic model by running the appropriate algorithm based on the user's interaction.

In some embodiments, the system takes into account the nature of the user interaction and uses this information to train the models. For example, the order or sequence in which the user generates labels to identify or define a ground truth specification, and the order or sequence in which the user changes labels (e.g., when a user changes a predicted specification to create a new ground truth specification) are taken into account and used to inform future predictions. In some cases, the model implements a number of functions directed to user interactions that involve training, predicting, and deleting. These include, for example, a user adding a new label (e.g., a ground truth specification), a user adding a piece of data, a user deleting a piece of data, a user adding a new document, and a user deleting a document. Adding a piece of data can include the user performing an operation on a target field or running a query with a particular function from which an inference can be drawn (e.g., a numerical query such as running a sum over a piece of data).

Additionally, the user can provide metadata about the target field or the system can prompt the user to provide metadata (e.g., if the system is uncertain about some characteristic of the data). The system can interactively prompt the user in response to a user's actions. If a user performs an operation on a target field indicating the value is a currency for example, as to whether a numerical value is currency and what type of currency. The system is able to acquire more training data from the user by tracking the user's activities and interactions with the data (e.g., the user may export the data to an excel spreadsheet). Rather than require the user to provide a large amount of data for training upfront, the system collects data interactively as the user engages with the system.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A computer system for providing real time feedback from a machine learning system, comprising:
   a processor; and
   a memory coupled with the processor, wherein the memory is configured to provide the processor with instructions which when executed cause the processor to:
   define a target field based on a first interaction of a user with the computer system;
   access a corpus of files to be analyzed, the corpus of files being identified by the user;
   apply a static machine learning model to at least one of the files to generate an output;
   automatically apply a dynamic learning model to the output of the static machine learning model to generate an analysis of the output;
   determine a correction of the analysis, the correction being based on a second interaction of the user with the computer system;
   retrain the dynamic machine learning model based on the correction; and
   generate an updated analysis of other files in the corpus of files based at least in part on reapplying the dynamic machine learning model to respective outputs of the static machine learning model for each of the other files of the corpus.

2. The system of claim 1 wherein applying a static machine learning model comprises pre-processing the corpus of files to be analyzed.

3. The system of claim 1 wherein applying a static machine learning model comprises pre-processing the corpus of files to be analyzed including by normalizing the files and storing the normalized files.

4. The system of claim 1 wherein applying a static machine learning model comprises pre-processing the corpus of files to be analyzed including by normalizing the files, storing the normalized files, and running an algorithm on the normalized files.

5. The system of claim 1 wherein applying a static machine learning model comprises pre-processing the corpus of files to be analyzed including by normalizing the files, storing the normalized files, and running an algorithm on the normalized files, wherein running the algorithm depends on the file type.

6. The system of claim 1 wherein the analysis of the file is based at least in part on a ground truth file generated in response to receiving a ground truth specification of the target field for the ground truth file.

7. The system of claim 1 wherein the analysis of the file comprises a predicted specification based at least in part on a ground truth file generated in response to receiving a ground truth specification of the target field for the ground truth file.

8. The system of claim 1 wherein the analysis of the file comprises a predicted specification so that the analyzed file becomes a predicted file, wherein the predicted specification is based at least in part on a ground truth file generated in response to receiving a ground truth specification of the target field for the ground truth file, and wherein:
   determining the correction comprises receiving a ground truth specification for the predicted file so that the predicted file becomes a new ground truth file;
   retraining the dynamic machine learning model based on the correction comprises retraining the dynamic machine learning model in response to receiving the ground truth specification for the predicted file; and
   generating an updated analysis of other files in the corpus of files based at least in part on reapplying the dynamic machine learning model to the respective outputs of the static machine learning model for each of the other files of the corpus comprises receiving, from the retrained dynamic machine learning model, a predicted specification of the target field for at least one of the other files in the corpus of files so that the file becomes a predicted file based at least in part on the retrained dynamic machine learning model.

9. A computer program product for providing real time feedback from a machine learning system, the computer program product being embodied in a tangible non-transitory computer readable storage medium and comprising computer instructions for execution by a computer system to perform operations comprising:
   defining a target field based on a first interaction of a user with the computer system;
   accessing a corpus of files to be analyzed, the corpus of files being identified by the user;
   applying a static machine learning model at least one of the files to generate an output;
   automatically applying a dynamic learning model to the output file of the static machine learning model to generate an analysis of the output;
   determining a correction of the analysis, the correction being based on a second interaction of the user;
   retraining the dynamic machine learning model based on the correction; and
   generating an updated analysis of other files in the corpus of files based at least in part on reapplying the dynamic machine learning model to respective outputs of the static machine learning model for each of the other files of the corpus.

10. A method for operating a computer system, the method comprising:
    defining a target field based on a first interaction of a user with the computer system;
    accessing a corpus of files to be analyzed, the corpus of files being identified by the user;
    applying a static machine learning model at least one of the files to generate an output;
    automatically apply a dynamic learning model to the output of the static machine learning model to generate an analysis of the output;
    determining a correction of the analysis, the correction being based on a second interaction of the user;
    retraining the dynamic machine learning model based on the correction; and
    generating an updated analysis of other files in the corpus of files based at least in part on reapplying the dynamic machine learning model to respective outputs of the static machine learning model for each of the other files of the corpus.

11. The method of claim 10 wherein applying a static machine learning model comprises pre-processing the corpus of files to be analyzed.

12. The method of claim 10 wherein applying a static machine learning model comprises pre-processing the corpus of files to be analyzed including by normalizing the files and storing the normalized files.

13. The method of claim 10 wherein applying a static machine learning model comprises pre-processing the corpus of files to be analyzed including by normalizing the files, storing the normalized files, and running an algorithm on the normalized files.

14. The method of claim 10 wherein applying a static machine learning model comprises pre-processing the corpus of files to be analyzed including by normalizing the files, storing the normalized files, and running an algorithm on the normalized files, wherein running the algorithm depends on the file type.

15. The method of claim 10 wherein the analysis of the file is based at least in part on a ground truth file generated in response to receiving a ground truth specification of the target field for the ground truth file.

16. The method of claim 10 wherein the analysis of the file comprises a predicted specification based at least in part on a ground truth file generated in response to receiving a ground truth specification of the target field for the ground truth file.

17. The method of claim 10 wherein the analysis of the file comprises a predicted specification so that the analyzed file becomes a predicted file, wherein the predicted specification is based at least in part on a ground truth file generated in response to receiving a ground truth specification of the target field for the ground truth file, and wherein:

determining the correction comprises receiving a ground truth specification for the predicted file so that the predicted file becomes a new ground truth file;

retraining the dynamic machine learning model based on to the correction comprises retraining the dynamic machine learning model in response to receiving the ground truth specification for the predicted file; and generating an updated analysis of other files in the corpus of files based at least in part on reapplying the dynamic machine learning model to the respective outputs of the static machine learning model for each of the other files of the corpus comprises receiving, from the retrained dynamic machine learning model, a predicted specification of the target field for at least one of the other files in the corpus of files so that the file becomes a predicted file based at least in part on the retrained dynamic machine learning model.

* * * * *